(12) United States Patent
Zhang et al.

(10) Patent No.: US 10,975,983 B2
(45) Date of Patent: Apr. 13, 2021

(54) WIREFORM CLIP FOR USE WITH SUPPLY VALVES

(71) Applicant: Oatey Co., Cleveland, OH (US)

(72) Inventors: Kai Zhang, Cleveland, OH (US); Aaron Lorkowski, North Ridgeville, OH (US); Kenneth Brown, Columbia Station, OH (US)

(73) Assignee: OATEY CO., Cleveland, OH (US)

( * ) Notice: Subject to any disclaimer, the term of this patent is extended or adjusted under 35 U.S.C. 154(b) by 192 days.

(21) Appl. No.: 15/933,946

(22) Filed: Mar. 23, 2018

(65) Prior Publication Data

US 2018/0283576 A1 Oct. 4, 2018

Related U.S. Application Data

(60) Provisional application No. 62/480,690, filed on Apr. 3, 2017.

(51) Int. Cl.
| | |
|---|---|
| *E03C 1/02* | (2006.01) |
| *F16L 37/14* | (2006.01) |
| *F16K 35/06* | (2006.01) |
| *F16K 29/00* | (2006.01) |
| *F16K 27/00* | (2006.01) |

(52) U.S. Cl.
CPC ............. *F16K 35/06* (2013.01); *E03C 1/021* (2013.01); *F16K 27/00* (2013.01); *F16K 27/003* (2013.01); *F16K 29/00* (2013.01); *F16L 37/144* (2013.01); *E03C 2001/028* (2013.01); *E03C 2201/40* (2013.01); *Y10T 137/698* (2015.04)

(58) Field of Classification Search
CPC ............... E03C 1/021; E03C 2001/028; E03C 2201/40; F16L 37/144; F16L 37/148; F16K 27/00; F16K 27/003; F16K 29/00; F16K 35/06; Y10T 137/698
USPC ................................................... 137/360, 361
See application file for complete search history.

(56) References Cited

U.S. PATENT DOCUMENTS

| | | | | | |
|---|---|---|---|---|---|
| 221,153 | A | * | 11/1879 | Chapin | F16L 37/144 285/305 |
| 2,535,016 | A | * | 12/1950 | Launder | F16L 37/12 285/98 |

(Continued)

FOREIGN PATENT DOCUMENTS

GB 902447 A 8/1962

*Primary Examiner* — Kevin F Murphy
*Assistant Examiner* — Jonathan J Waddy
(74) *Attorney, Agent, or Firm* — BakerHostetler

(57) ABSTRACT

A system of supply valves according to the present invention may include a first and second supply valve, each of which is connectable to a terminal end of a water supply line so as to provide direct access to the water supply. The system may be disposed within a modular plumbing supply box, and the valves may be spaced from one another by a reduced separation, $X_1$. Each supply valve of the system may further include a top portion and bottom portion that are interconnectable and which form a water-proof seal therebetween. The top portion may comprise ridges that cooperate with channels of the bottom portion when the two portions are interconnected to form passageways. The top and bottom portions may be positionally and rotationally locked to one another, for example, using a wireform clip and inserting legs of the wireform clip through the passageways.

19 Claims, 18 Drawing Sheets

(56) References Cited

U.S. PATENT DOCUMENTS

| | | | |
|---|---|---|---|
| 2,671,516 A * | 3/1954 | Grant, Jr. | F16L 37/32 251/25 |
| 3,350,118 A | 10/1967 | Neubauer | |
| 3,538,940 A | 11/1970 | Graham | |
| 3,698,747 A * | 10/1972 | Wing | F16L 37/144 285/305 |
| 4,059,295 A * | 11/1977 | Helm | F16L 37/144 285/305 |
| 4,431,218 A * | 2/1984 | Paul, Jr. | F16L 37/144 285/305 |
| 4,433,861 A | 2/1984 | Kreczik | |
| 4,537,427 A * | 8/1985 | Cooke | F16L 37/144 285/305 |
| 4,811,975 A * | 3/1989 | Paul, Jr. | F16L 37/144 285/305 |
| 5,040,831 A * | 8/1991 | Lewis | F16L 37/144 285/305 |
| 5,092,300 A | 3/1992 | Imoehl et al. | |
| 5,305,785 A * | 4/1994 | Humber | F16L 5/00 137/360 |
| 5,513,882 A | 5/1996 | Lewis | |
| 5,566,708 A * | 10/1996 | Hobbs, Jr. | F16L 19/02 137/360 |
| 5,964,483 A | 10/1999 | Long et al. | |
| 5,983,923 A * | 11/1999 | Hobbs | E03B 7/095 137/360 |
| 6,059,324 A * | 5/2000 | Fricker | F16L 37/144 285/305 |
| 6,241,740 B1 * | 6/2001 | Davis | A61B 17/1227 606/139 |
| 6,447,022 B1 | 9/2002 | Allen | |
| 6,510,748 B2 * | 1/2003 | Cooper | G01F 1/28 137/360 |
| 6,682,100 B2 | 1/2004 | Wood et al. | |
| 6,908,119 B2 | 6/2005 | Murken | |
| 10,612,682 B1 * | 4/2020 | Moore | A01G 25/16 |
| 2003/0052484 A1 * | 3/2003 | Rautureau | F16L 37/0885 285/305 |
| 2004/0108717 A1 * | 6/2004 | Matsubara | F16L 37/144 285/330 |
| 2006/0202475 A1 * | 9/2006 | Gunderson | F16L 37/088 285/305 |
| 2006/0284414 A1 * | 12/2006 | Green | F16L 37/091 285/18 |
| 2009/0160185 A1 | 6/2009 | Learmont et al. | |
| 2012/0042963 A1 | 2/2012 | Sanzone et al. | |
| 2012/0211688 A1 * | 8/2012 | Carlson | F16K 31/043 251/291 |
| 2013/0082201 A1 * | 4/2013 | Condon | E03C 1/021 251/213 |
| 2014/0175004 A1 * | 6/2014 | Tsuchiya | B01D 35/30 210/453 |
| 2015/0122342 A1 * | 5/2015 | Ismert | F16L 55/1152 137/15.09 |
| 2015/0338001 A1 * | 11/2015 | Bush | F16L 21/06 285/179 |
| 2018/0094411 A1 * | 4/2018 | O'Neill | D06F 39/08 |
| 2019/0226616 A1 * | 7/2019 | Chen | F16L 41/021 |
| 2019/0242510 A1 * | 8/2019 | Klein | F16L 37/0985 |

* cited by examiner

WIREFORM CLIP FOR USE WITH SUPPLY VALVES

CROSS-REFERENCE TO RELATED APPLICATIONS

This application claims the benefit of U.S. Provisional Application No. 62/480,690 filed Apr. 3, 2017, the disclosure of which is incorporated by reference herein in its entirety.

TECHNICAL FIELD

The present disclosure relates to a design for a wireform clip for use with supply valves, depending from supply lines carrying a fluid medium, such as liquid water, therethrough.

BACKGROUND

Conventional plumbing outlet boxes are typically used as housings for connections to plumbing systems. A plumbing outlet box may be provided, for example, for connecting a washing machine to pipes running within the walls of a building that are designed to carry water (e.g., hot and cold water supply and drain connections). As another example, a plumbing outlet box may be provided to connect an ice maker of a refrigerator to a water supply. Plumbing outlet boxes are generally installed in the walls of a house or other climate-controlled building. Often more than one plumbing outlet box is needed in the same area, each with the capability of connecting to different appliances having different configurations and requirements.

As noted above, supply lines very typically carry water (or another liquid) to a desired appliance, and those supply lines enter a typical plumbing outlet box and terminate in supply valves, which enable attachment of the supply lines to a desired appliance. Accordingly, the supply valves are installed at the terminal junction of the supply line, most usually within the plumbing outlet box.

In a traditional arrangement, the supply valve generally consists of a main body that attaches to the terminal end of the supply line, and the main body may further include one or more outlets, to enable attachment of a hose servicing an appliance, a water hammer arrestor, or to another line or device. The main body portion may consist of first (e.g., top) and second (e.g., bottom) elements that may be individually threaded into the adjoining supply line and to one another so as to join them together. These existing supply valves are cumbersome and must usually include a relatively large amount of clearance in each lateral direction from the box walls, an adjacent supply valve, or both. Such distance may be excessive, to ensure that the supply valves can be adequately installed and serviced (including being repaired and replaced) post-installation, as is required by plumbing code.

When the above-described existing supply valves fail or require repair or replacement, e.g., due to wear and tear, they are difficult to disassemble or otherwise remove from the supply lines. This difficulty may be due, in part, to their cumbersome design and installation methods, and their disassembly may be further complicated by rust build-up at the threaded junctions between the supply valve body portion and the supply lines, which makes rotation about the threading difficult to impossible without the application of extreme force or cutting the valve off of the line. Another difficulty with existing supply valves may result from a user's lack of access to the supply valves. In other words, when a user wants to remove the supply valve, he may have limited vantage to reach into the plumbing outlet box to perform the disassembly. Also, and given the usual proximity of an immediately adjacent supply valve (which is not being repaired or replaced in this context), a user may encounter difficulty engaging the supply valve to be repaired/replaced either with their hands or with a plumbing tool, and even upon successful engagement, the repair/replacement may be cumbersome and time-consuming.

Accordingly, there is a need for a supply valve that installs easily and may easily and quickly be repaired/replaced, given the limited vantage a user has to effectuate such installation or removal. There is also a need for a supply valve that requires minimal clearance to complete an installation or removal, such that the supply valve may be located within a smaller plumbing outlet box or closer (in proximity) to an adjacent supply valve.

SUMMARY OF THE INVENTION

A supply valve for use with water supply lines, according to an embodiment, may comprise a top portion and a bottom portion separately formed from the top portion. The top portion may have at least two ports, a central valve area, and a ridged lower area that extends around a first one of the at least two ports. The central valve area may be configured to receive a valve therein, and the ridged lower area includes a plurality of ridges. Each ridge may have a diameter measured with respect to a first axis disposed centrally though the top portion. The bottom portion may have an upper mating area, a lower connection area, and a hollow chamber extending through the bottom portion from the upper mating area to the lower connection area. The upper mating area may include two channels on opposing sides of a central axis, where each channel extends through the upper mating area and into the hollow chamber.

The supply valve may further include a wireform clip that is selectively interconnectable to the top and bottom portions to detachably couple them to one another. The clip may have two opposed legs that are joined together at a narrowed gripping area and extending outwardly therefrom along a first clip direction. The legs may angularly diverge with respect to one another as they extend outwardly from the narrowed gripping area, and they may subsequently curve and converge as they terminate in end portions of the legs. A distance between respective end portions of each one of the two legs, as measured along a second clip direction, substantially perpendicular to the first clip direction, may be less than the diameter of the ridges of the top portion.

To assemble the top and bottom portions, the ridged lower area of the top portion may be inserted into the hollow chamber of the bottom portion. Generally, the top portion is sized and configured to be inserted in this manner. When the top and bottom portions are assembled, the central axis of the bottom part may be aligned with the first axis of the top part. Additionally, when the top and bottom portions are assembled, one of the plurality of ridges of the top portion is substantially aligned along the first axis with the channels of the bottom portion, such that the one of plurality of ridges and the channels may cooperate to form two passageways. Once the passageways are formed in this manner, the legs of the wireform clip may be configured to be inserted therein. When the legs are so inserted and extend through at least a substantial majority of the passageways, it may define a locked configuration. In the locked configuration, the top portion and bottom portion typically may not translate relative to one another along a direction parallel to the central axis (and first axis) and may not rotate relative to one another about the central axis (and first axis).

A supply valve system, according to an embodiment, may comprise a first supply valve including a first bottom portion and a separately formed first top portion. The first bottom portion may extend along a first central axis and have first and second channels extending through a first upper part of the first bottom portion on opposing sides of the first central axis. The first bottom portion may further have a first lower part configured to interconnect to a water supply line. The first top portion may have a first ridged bottom area that is sized and configured to be received within a first hollow central portion of the first bottom portion. The first supply valve may also include a first wireform clip, insertable through the first and second channels and along a narrowed portion of the first ridged bottom area, so as to positionally and rotationally lock the first top and first bottom portions with respect to one another.

The supply valve system may additionally comprise may comprise a second supply valve including a second bottom portion and a separately formed second top portion. The second bottom portion may extend along a second central axis and have third and fourth channels extending through a second upper part of the second bottom portion on opposing sides of the second central axis. The second bottom portion may further have a second lower part configured to interconnect to a water supply line. The second top portion may have a second ridged bottom area that is sized and configured to be received within a second hollow central portion of the second bottom portion. The second supply valve may also include a second wireform clip, insertable through the third and fourth channels and along a narrowed portion of the first ridged bottom area, so as to positionally and rotationally lock the second top and second bottom portions with respect to one another.

In another aspect, the first and second supply valves may be installed within a single utility supply box and be separated from one another by a distance X1 as measured between the respective first and second central axes. The distance X1 may fall within the range of 1.75-2.00 inches. In further aspects, the first wireform clip may be operable with the second supply valve, such that the first wireform clip may be configured to positionally and rotationally lock the second top and second bottom portions with respect to one another. In still further aspects, the first bottom portion may be operable with the second top portion, such that the first wireform clip may be configured to positionally and rotationally lock the second top portion and the first bottom portions with respect to one another.

DETAILED DESCRIPTION

The supply valve system of the present invention, as shown and described herein, may comprise any number of supply valves, which (in the case of multiple valves) may be installed in series with one another within a single plumbing outlet box, or such valves may be installed in multiple adjacent boxes where the boxes are connected to one another in series. Thus, the exemplary embodiments illustrated and described herein, which may relate to two adjacent valves within a single box, are not to be considered as limiting the scope of the invention, which is contemplated to include other arrangements of valves and boxes.

Because plumbing outlet boxes are mounted within a wall space and an interior portion of the boxes remain accessible to a user once the wall has been installed around the box, portions of the supply valve system will remain accessible to the user through the opening in the box.

Figure 1A:
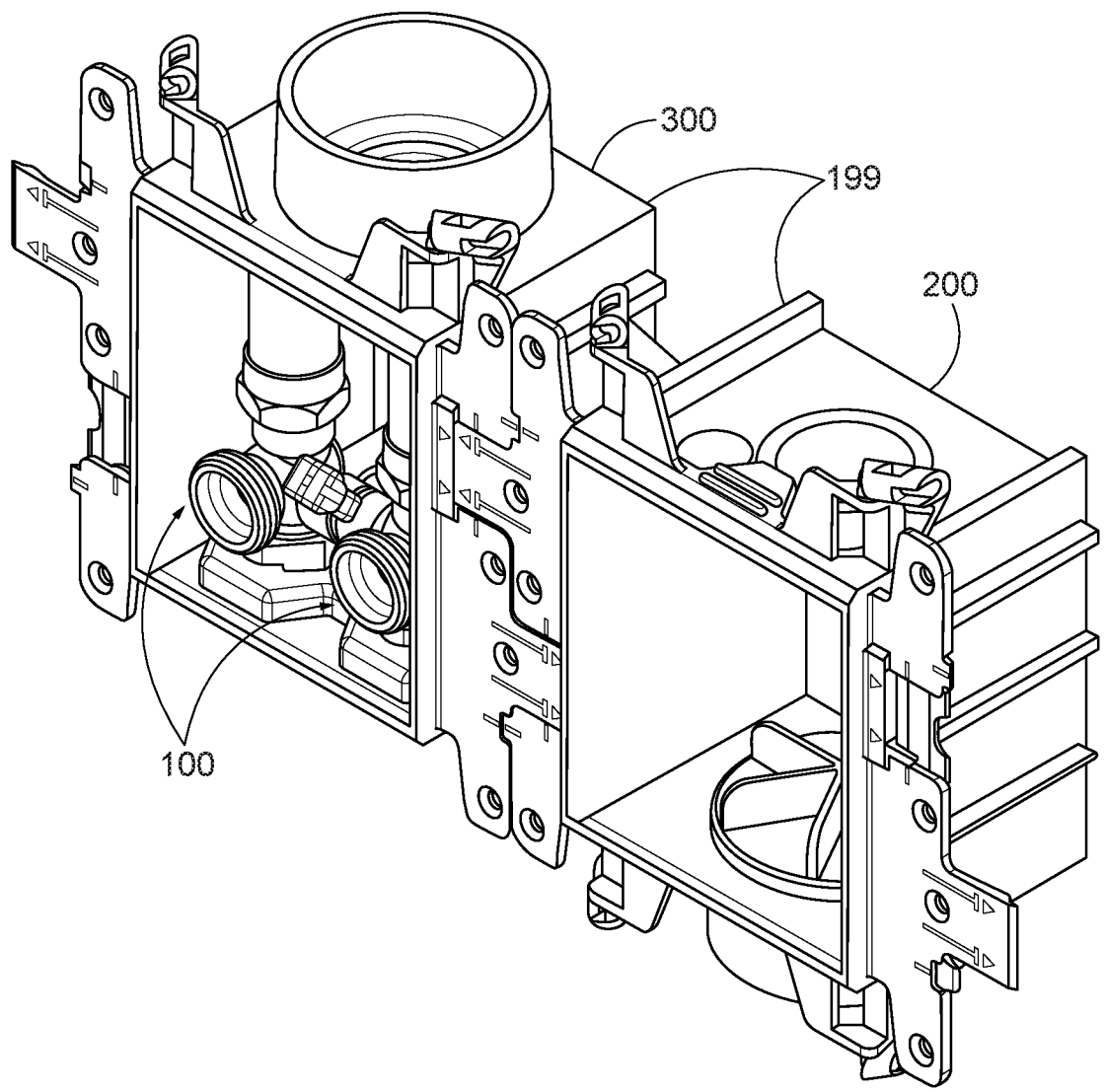
FIG. 1A is a front perspective view of a modular plumbing box system, including a set of supply valves according to an embodiment of the invention.
Figure 1B:
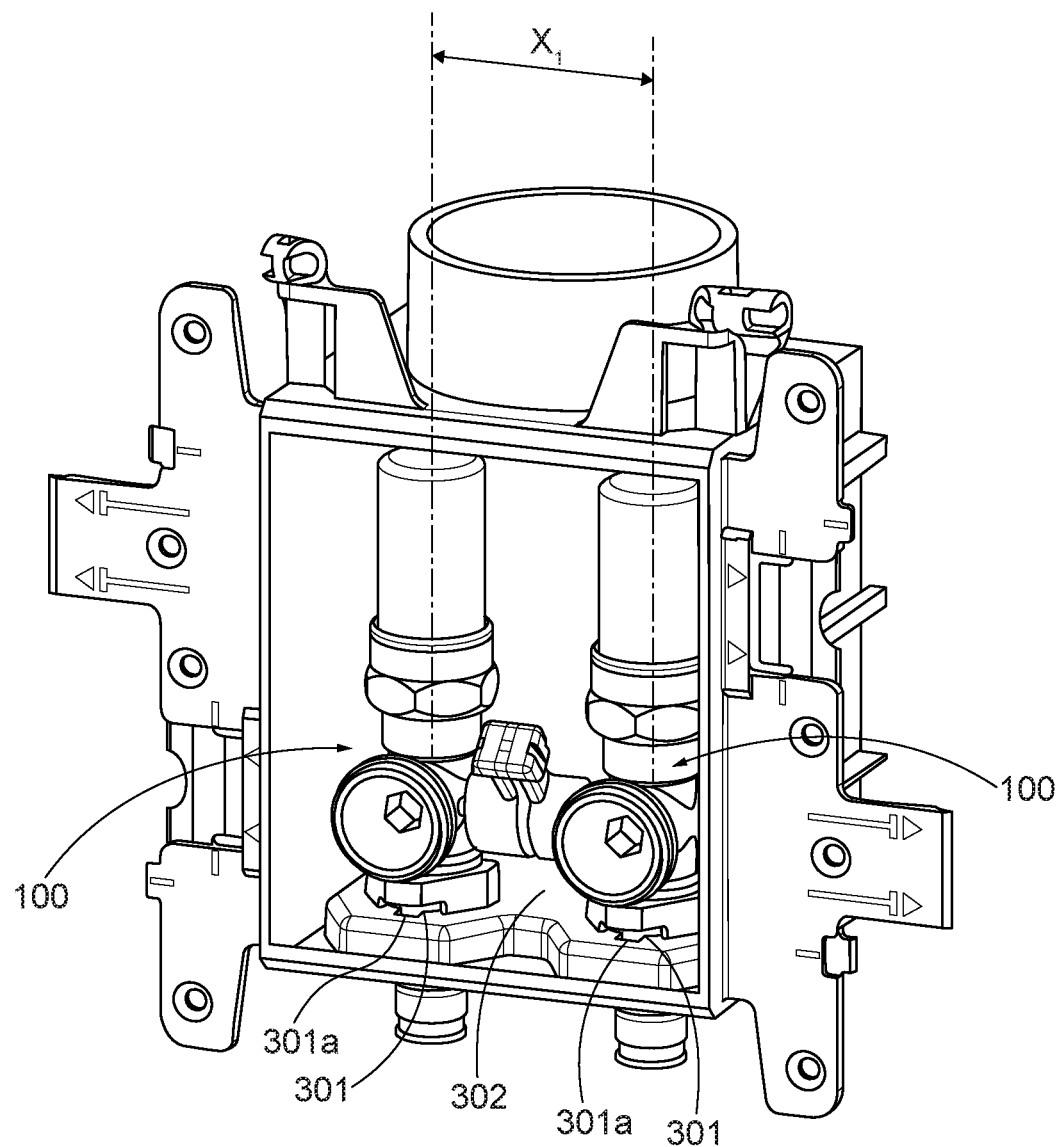
FIG. 1B is a front perspective view of a modular plumbing supply box, including a set of supply valves according to an embodiment of the invention.

With reference to FIG. 1A, a modular plumbing box system may comprise, as shown, two modular plumbing boxes (199), including a dedicated drain box (200) on the right and a dedicated supply box (300) on the left. As shown, the boxes (200, 300) may be configured to be connected directly to one another in series, and they may house plumbing connections or ports that cooperate with various appliances to provide water supply, drain access, or both. The supply box (300) is characterized as such because it typically houses supply valves (100) that extend from terminal ends of water supply lines (not illustrated) adjacent the supply box (300). The supply valves (100) enter into the supply box (300) through one or more supply valve openings (301, see FIG. 1B) that extend through a bottom wall (302) of the supply box (300). As shown in FIGS. 1A and 1B, the supply box (300) may contain two supply valves (100), each one connected to a respective supply line that supplies, for example, hot and cold water to an appliance (not shown).

Figure 2:
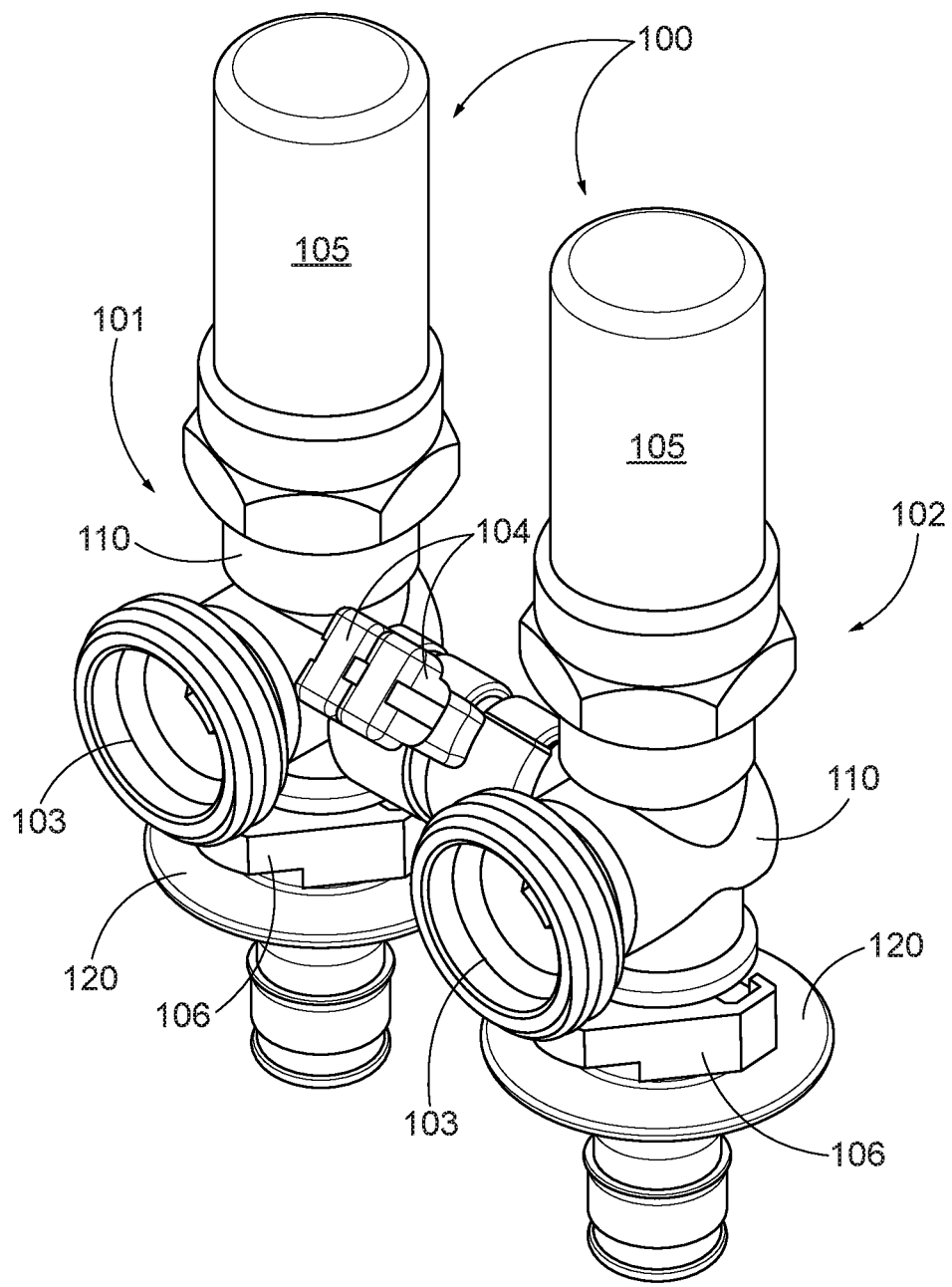
FIG. 2 is a front perspective view of the set of supply valves illustrated in FIG. 2.
Figure 3:
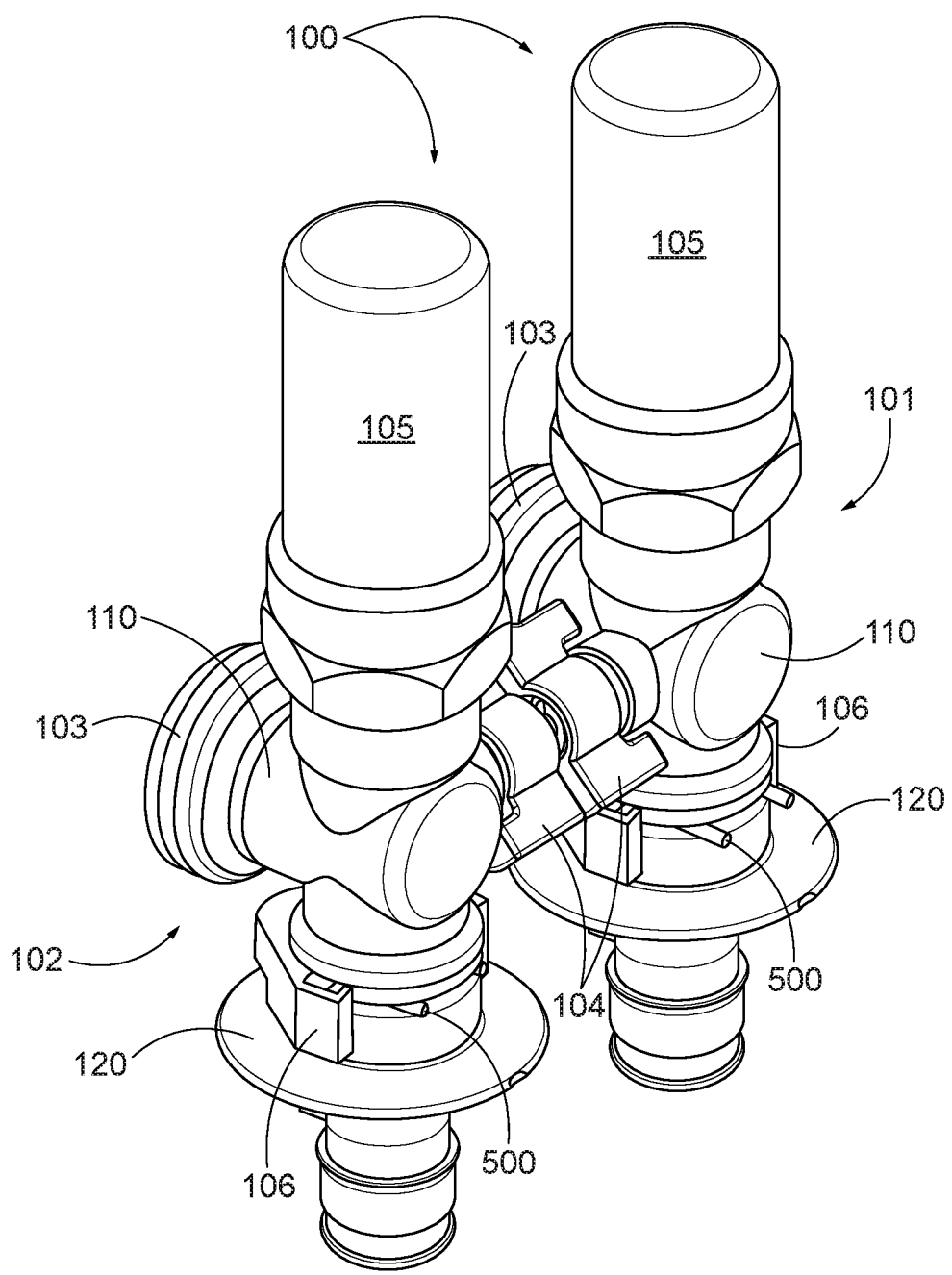
FIG. 3 is a rear perspective view of the set of supply valves illustrated in FIG. 3.

With reference now to FIGS. 2 and 3, two supply valves (100) are illustrated adjacent to one other: a first supply valve (101) and a second supply valve (102). Each valve (100) includes a threaded connector (103) near a front portion of the valves (100), where the threads of the threaded connectors (103) are sized and configured to receive and mate with a hose of, for example, an appliance to which water is to be supplied. The first and second supply valves (101, 102) are functionally identical to one another, and they visually differ only insofar as a shut-off lever (104) of the first valve (101) is on the right side of the valve (101) (see FIG. 2) while a shut-off lever (104) of the second valve (102) is on the left side of the valve (102) (see FIG. 2). It should be noted that any description relating to the first valve (101), as may be illustrated in FIG. 4 or succeeding figures, pertains equally to the second valve (102) and that likewise, any description pertaining to the second valve (102) applies equally to the first valve (100).

The shut-off levers (104) as shown are low profile constructs that connect to an internal valve (not illustrated) within each of the first and second valves (101, 102). Actuation of the shut-off levers (104) will cause the internal valve to angularly rotate to cutoff water supply from the threaded connectors (103) and divert it only toward an upper terminal end that is fitted with, for example, a water hammer arrestor (105). As shown in FIG. 1B and noted in the description above, it is desirable for the supply valves (100) to remain accessible within the supply box (300). For example, and in the event of an emergency, a user may need to shut off the water supply to the appliance, and as such would need to access the shut-off levers (104). In aspects where the valves (100) need to be repaired or replaced, the supply box (300) provides the user with the only access to the valves (100) through the open portion of the box.

As will be described in greater detail in the paragraphs below, each valve (100) includes a top portion (110) and a separately formed bottom portion (120) that may be releasably/detachably joined (or interconnected) together by a clip, such as wireform clip 500 or 500' (see, e.g., FIGS. 4, 12, and 13). Although the differences between clip (500) and clip (500') will be described in greater detail below, reference herein to clip (500) in describing the illustrated embodiments equally includes clip (500') unless specified otherwise. When the top and bottom portions (110, 120) are releasably joined together by the clip (500), the valve (100) may define an inserted configuration, and when the valve (100) has been assembled with a water supply line and secured into place, the valve (100) may define an installed configuration. In some embodiments, the clip (500) may be covered by a clip cover (106) that prevents the clip (500) from being inadvertently disengaged. The functionality of the clip (500) will be described in greater detail in the description below. The top portion (110) as illustrated in FIGS. 2 and 3 may include the threaded connector (103), but it is also contemplated that in some embodiments the bottom portion (120) may include the threaded connector (103).

Figure 4:
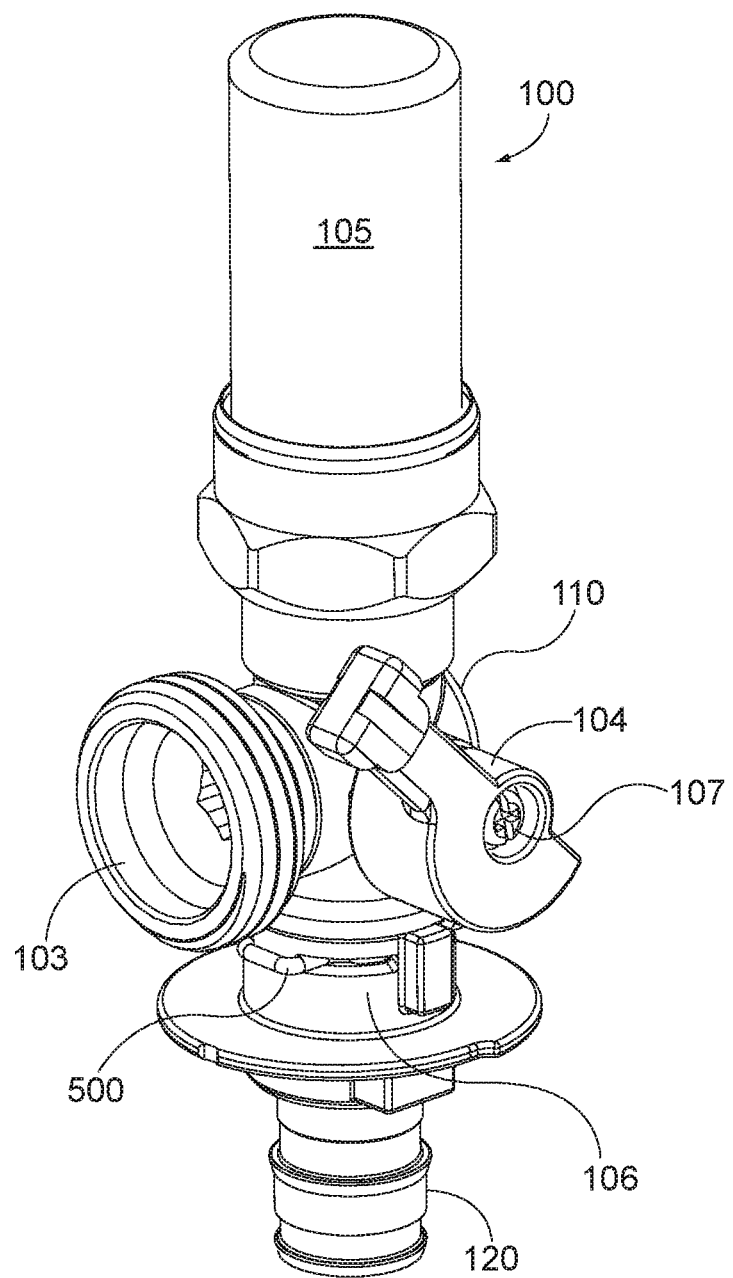
FIG. 4 is a front perspective view of a supply valve according to an embodiment of the invention, with a portion of the valve shown transparently for clarity.

With reference to FIG. 4, a valve (100) is shown in greater detail. Notably in this view, the clip cover (106) is shown transparently for clarity and to show the location of the wireform clip (500) therebeneath. In the embodiment shown, the clip cover (106) may be detachably connected to the valve (100) at an overlapping portion of both the top portion (110) and the bottom portion (120) and it may completely or partially overly the wireform clip (500) (or other connecting means) to prevent the same from disengaging. As illustrated in FIG. 4, the wireform clip (500) is disposed within the valve (100) between the top portion (110) and the bottom portion (120) in the inserted configuration.

Figure 6:
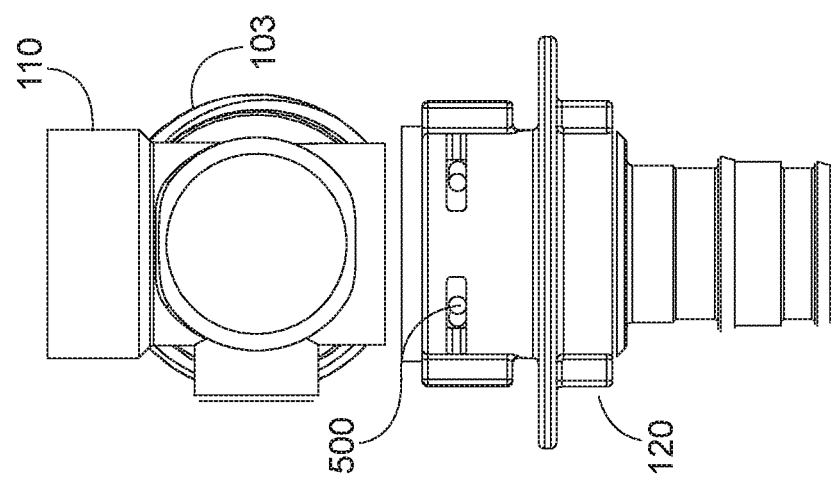
FIG. 6 is a rear plan view of the portion of the supply valve illustrated in FIG. 5, also including the wireform clip in the inserted configuration.
Figure 5:
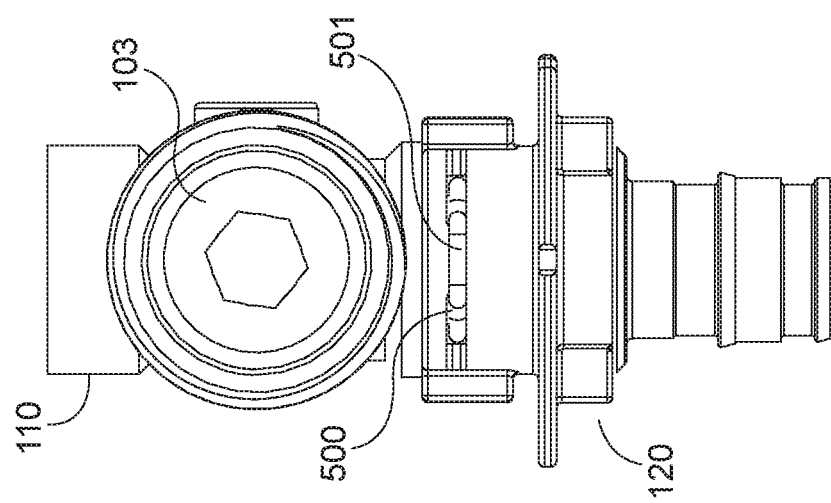
FIG. 5 is a front plan view of a portion of a supply valve, according to an embodiment of the invention, where the valve further includes a wireform clip in an inserted configuration.
Figure 7:
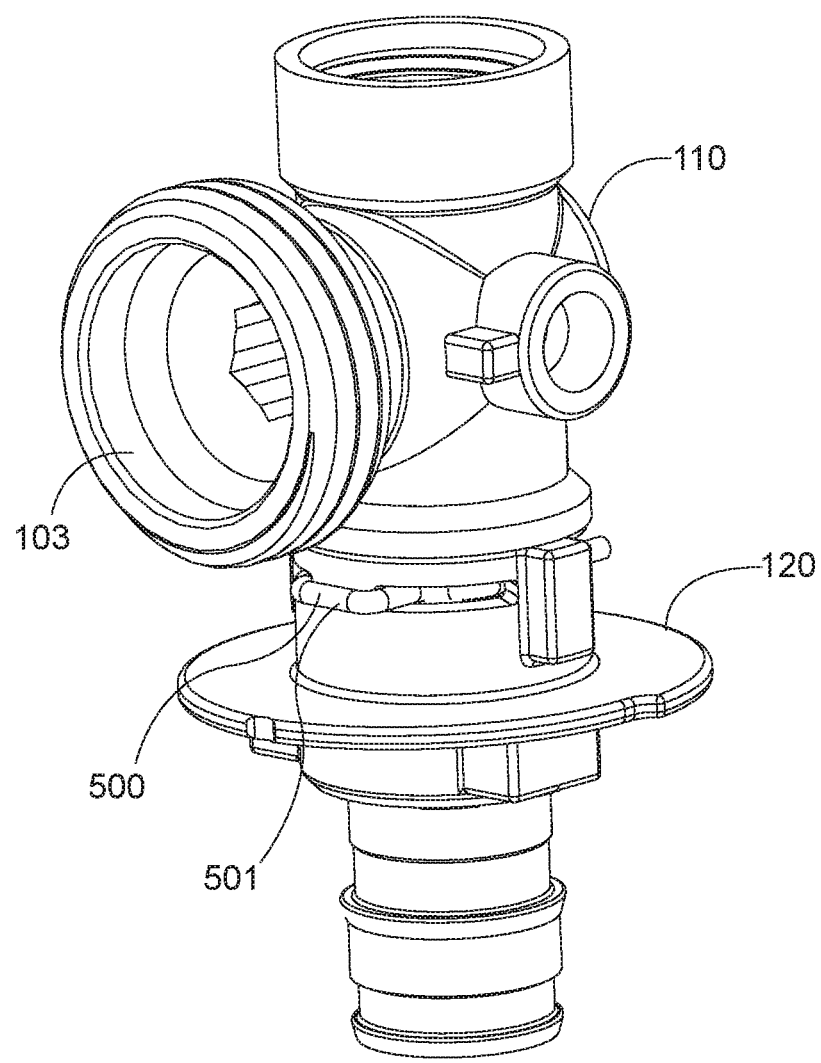
FIG. 7 is a front perspective view of the portion of the supply valve illustrated in FIGS. 5-6, also including the wireform clip in the inserted configuration.

With reference now to FIGS. 5-7, a portion of the valve (100) is illustrated, the portion including the top portion (110), the bottom portion (120), the threaded connector (103), and the wireform clip (500). The clip cover (106) (see FIGS. 3 and 4) has been removed in this illustration to expose the wireform clip (500) therebeneath. Although a method of use is described in greater detail below, the user typically will remove the clip cover (106) to expose the wireform clip (500) therebeneath. As shown, a narrowed gripping area (501) of the wireform clip (500) protrudes outwardly when the clip (500) is in the inserted configuration, and a user may grasp the clip (500) at the gripping area (501), either with their fingers or with a tool, in order to remove the clip (500). It is contemplated that, in some embodiments, the clip cover (106) is optional and may be omitted.

Figure 8:
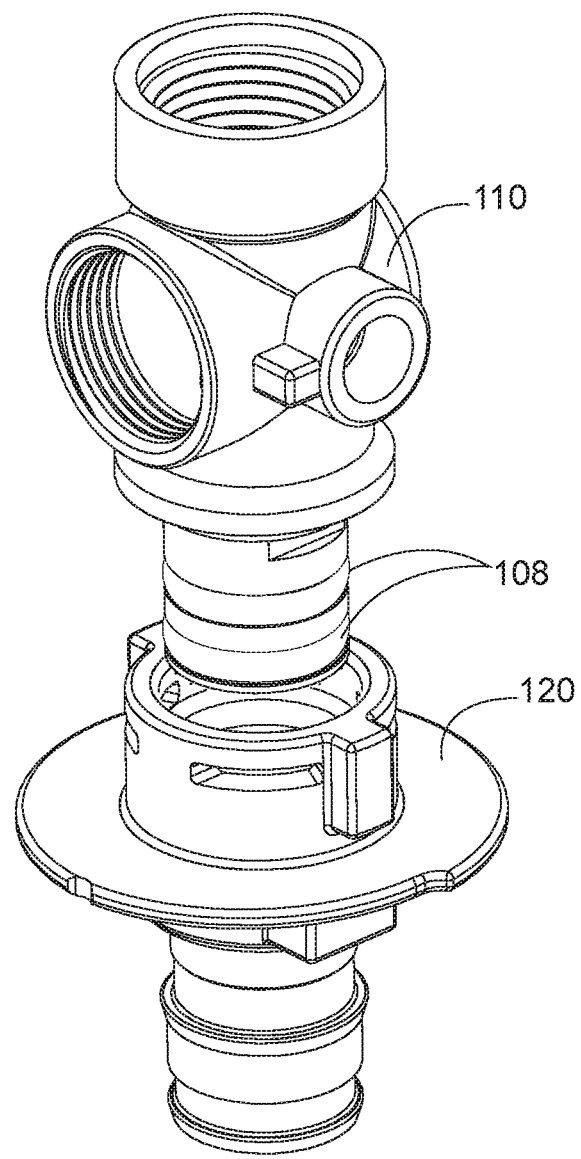
FIG. 8 is a front perspective, exploded view of a portion of a supply valve according to an embodiment of the invention.

With reference now to FIG. 8, the top and bottom portion (110, 120) of the valve (100) are shown in an exploded view, without the threaded connector (103) and without the clip (500). As shown, and as will be described in greater detail below, the top portion (110) may be inserted into the bottom portion (120) so as to join the two portions together and so as to create a leak-proof seal therebetween. One of skill in the art will appreciate the importance of having a leak proof seal with a valve assembly, considering that the water within the supply lines (terminating in the valves (100)) is under a constant pressure from the water source in order to encourage the flow of water to the appliance, and the risk of leaks increases with the number of components being connected to the terminal end of a water supply line. Accordingly, when the top and bottom portions (110, 120) of the valve (100) are connected, as will be described in greater detail below, a series of o-rings (108) that are fitted onto the top portion (110) may cooperate with an interior portion of the bottom portion (120) so as to sealingly join the top and bottom portions (110, 120) together and to thereby create a leak-proof seal therebetween.

Figure 9A:
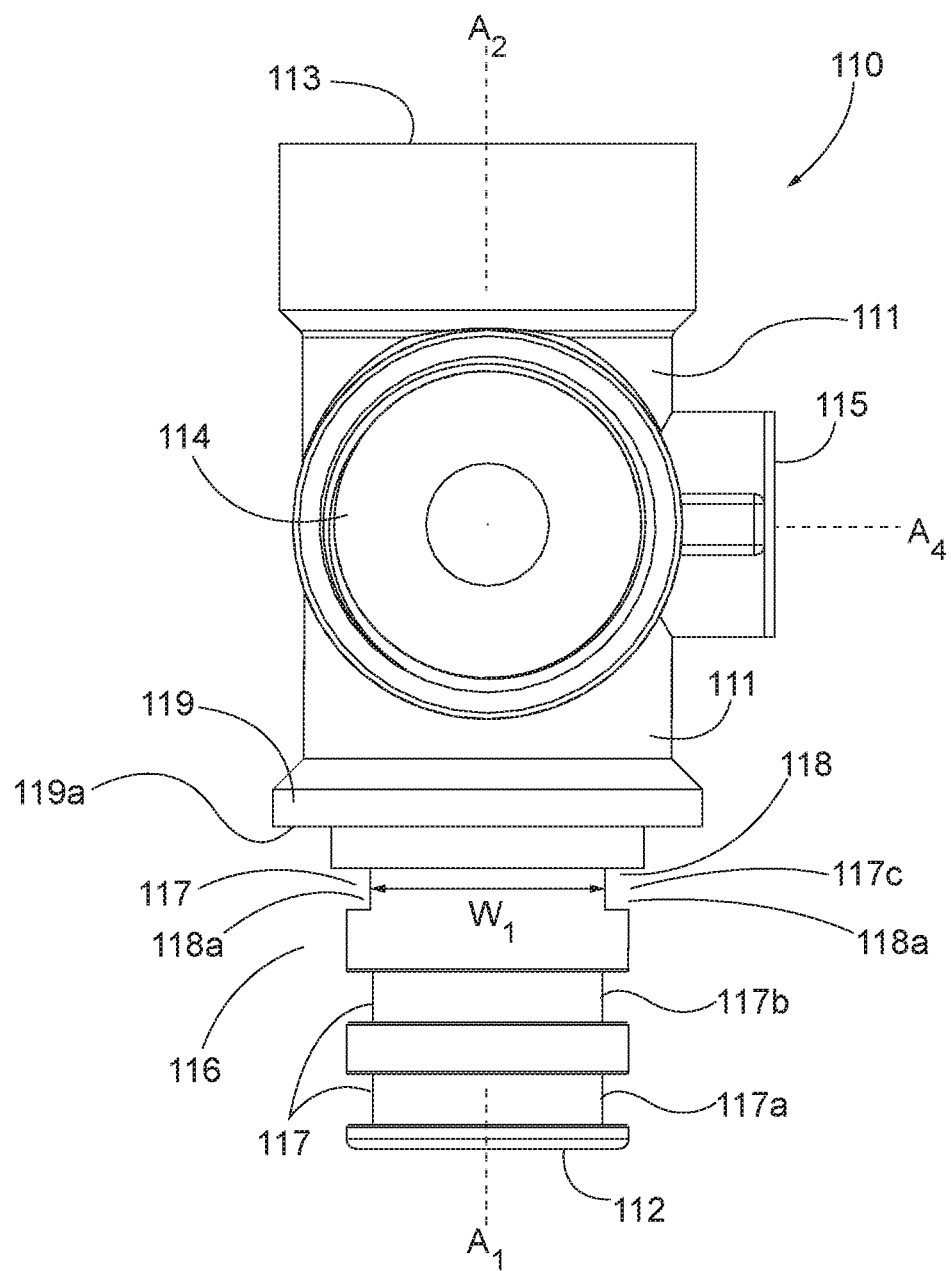
FIG. 9A is a front plan view of a top portion of a supply valve according to an embodiment of the invention.
Figure 9B:
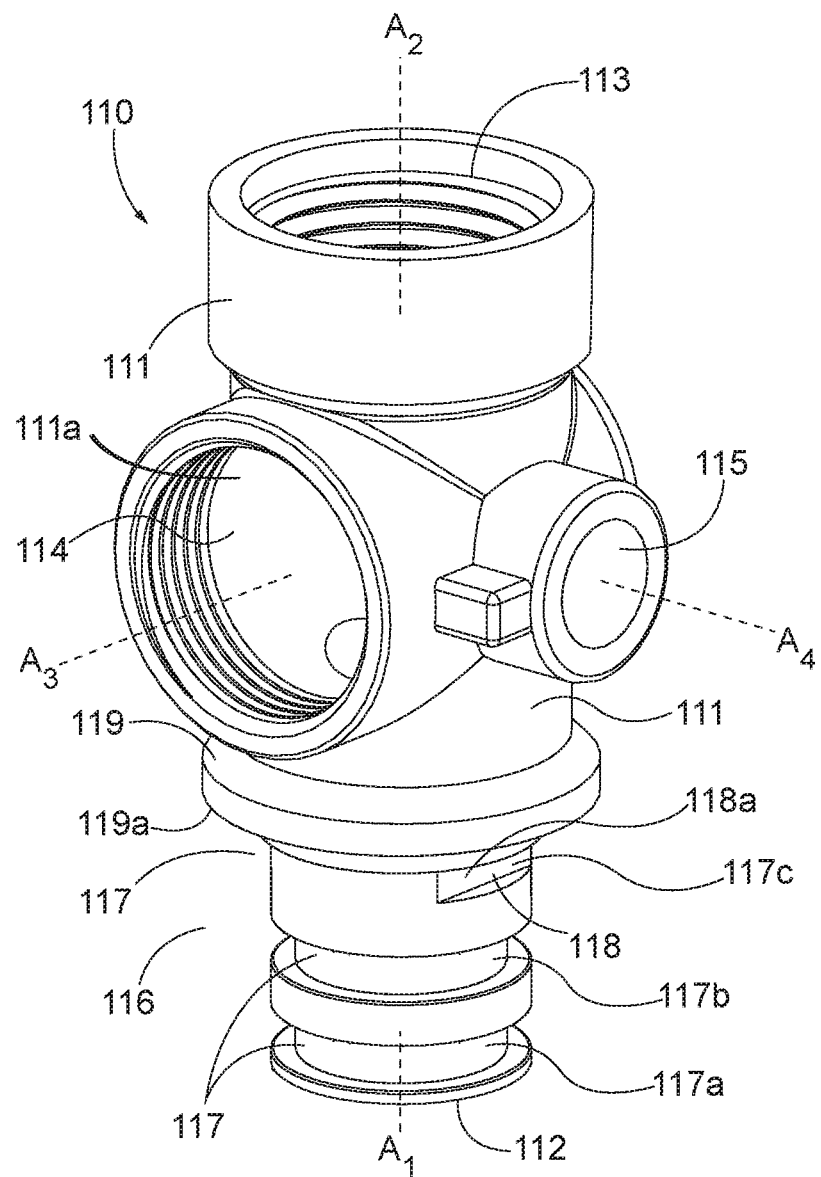
FIG. 9B is a front perspective view of the top portion of the supply valve illustrated in FIG. 9A.
Figure 9C:
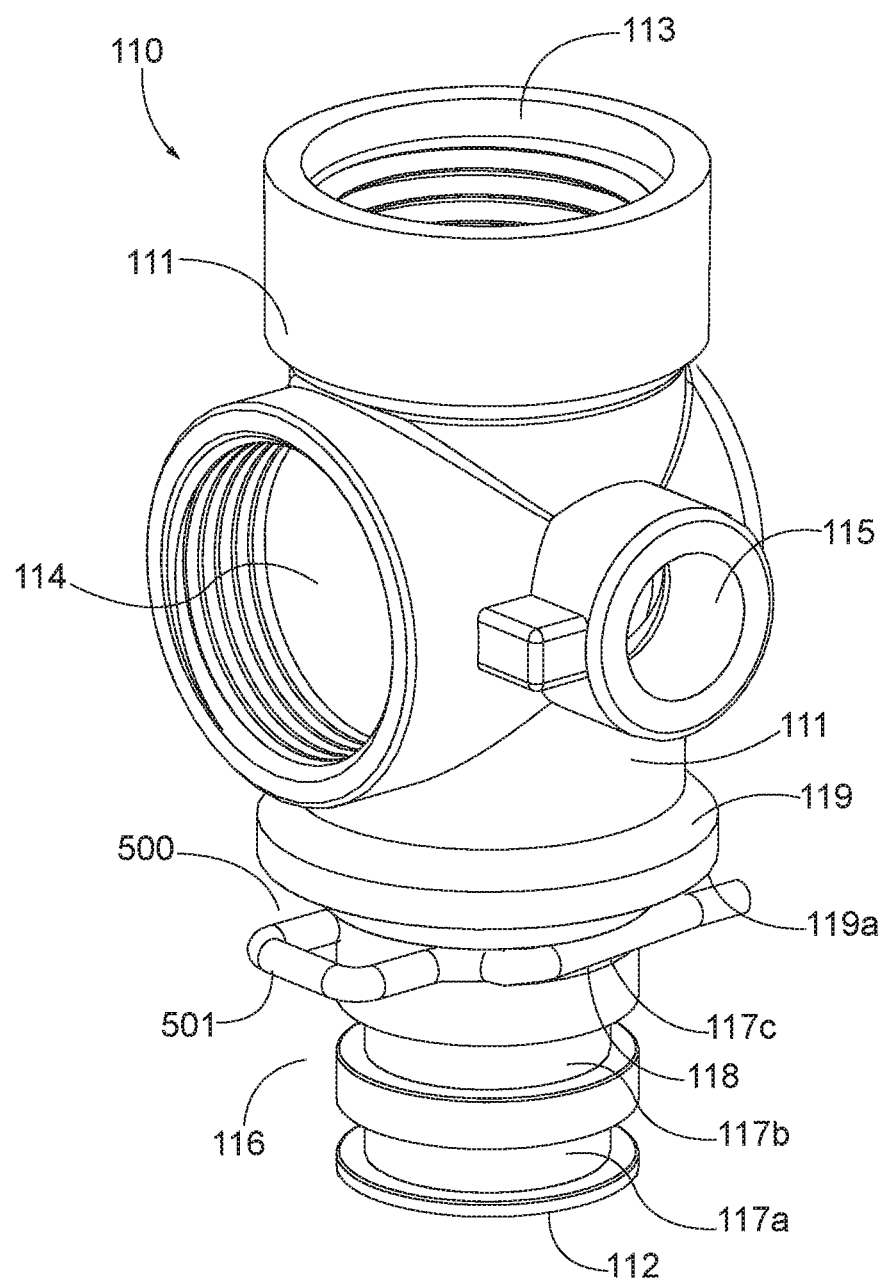
FIG. 9C is a front perspective view of the top portion of the supply valve illustrated in FIG. 9B, including a wireform clip in an inserted configuration.

With reference now to FIGS. 9A-9C, the top portion (110) is shown in greater detail. As shown, the top portion (110) has a body (111) that defines a plurality of ports or openings therein. In the illustrated embodiment, the body (111) defines four ports: a first port (112), a second port (113), a third port (114), and fourth port (115), where each of the four ports (112, 113, 114, 115) open into a hollow central portion (111a) of the body (111). The hollow central portion (111a) is configured to allow the flow of water (or other fluid medium) through an entirety of the body (111), subject to the control or redirection of an internal valve (not illustrated). Each of the ports (112, 113, 114, 115) extend along respective first, second, third, and fourth axes ($A_1, A_2, A_3, A_4$) into the body (111). The first and second axes ($A_1, A_2$) are substantially aligned as shown, whereas the third axis ($A_3$) is substantially perpendicular to the first and second axes ($A_1, A_2$), and whereas the fourth axis ($A_4$) is substantially perpendicular to both the first and second axes ($A_1, A_2$) and to the third axis ($A_3$). The ports (112, 113, 114, 115) may be fitted with an internal threading, or other similar locking feature known in the art, to connect other devices to the body (111) of the top portion (110). As shown in FIGS. 9A-9C, the second port (113) and the third port (114) are so configured with threading so as to permit attachment of, for example, the water hammer arrestor (105) and the threaded connector (103), respectively. As shown in FIG. 9C, the fourth port (115) may also include a small amount of internal threading to accommodate a screw (107) (see FIG. 4) that attaches the shut-off lever (104) to the internal valve (not illustrated) as described above. The first port (112) typically does not include threading, but rather includes a narrow ridged area (116) an external portion of the body (111). As illustrated in FIGS. 9A-9C, the ridged area (116) is located at a lower area of the body (111) of the top portion (110).

With continuing reference to FIGS. 9A-9C, the ridged area (116) includes a plurality of ridges (117) having a reduced diameter about the first axis ($A_1$) with respect to a remaining portion of the ridged area (116). As illustrated, the ridged area (116) may include first and second ridges (117a, 117b) that extend about a periphery of the ridged area (116). The ridged area (116) may also include a third ridge (117c) that does not extend about a periphery of the ridged area (116). As shown more particularly in FIG. 9C, the third ridge (117) may be configured as a clip-receiving ridge (118), which is sized and configured to receive a portion of the wireform clip (500), as will be described in greater detail below. The clip-receiving ridge (118) as illustrated includes two recessed portions (118a) on opposing sides of the ridged area (116), best shown in FIGS. 9A-B, each of which is configured to receive a leg (502) of the wireform clip (500). As illustrated, and for ease of alignment (as will be described in greater detail below), the recessed portions (118a) may extend parallel to one another through the body (111) along a direction that is parallel with the third axis ($A_3$). The two recessed portions (118a) may be spaced from one another along a direction perpendicular to the third axis ($A_3$) by a first width ($W_1$) (shown in FIG. 9A) that may be substantially equal to the reduced diameter of the ridges (117). In some embodiments, the first and second ridges (117a, 117b) may receive o-rings (108) as shown in FIG. 8, or another sealing member known in the art therein, such that when the ridged area (116) of the top portion (110) is inserted into the bottom portion (120) as described in greater detail below, the o-rings (or other sealing means) will seal against an inner surface of the bottom portion (120). The top portion (110) may further include a flange (119) extending outwardly from the body (111). The flange (119) includes a flange-mating surface (119a) (as shown best in FIG. 9A) that is configured to abut against a top surface (126) on the bottom portion (120) (see FIG. 10C) when the ridged area (116) of the top portion (110) is inserted into the bottom portion (120), as described in greater detail below.

Figure 10A:
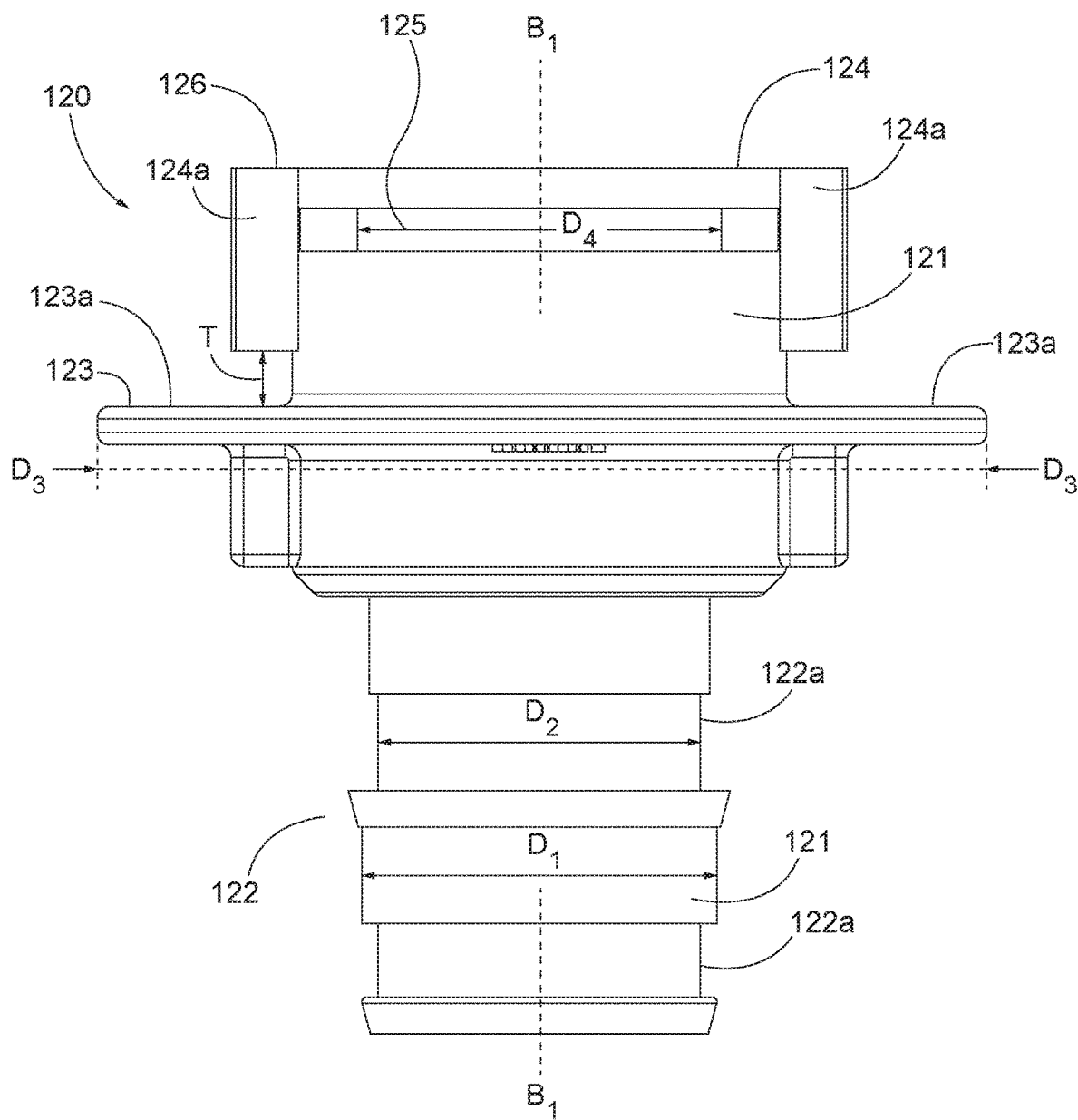
FIG. 10A is a front plan view of a bottom portion of a supply valve according to an embodiment of the invention.
Figure 10B:
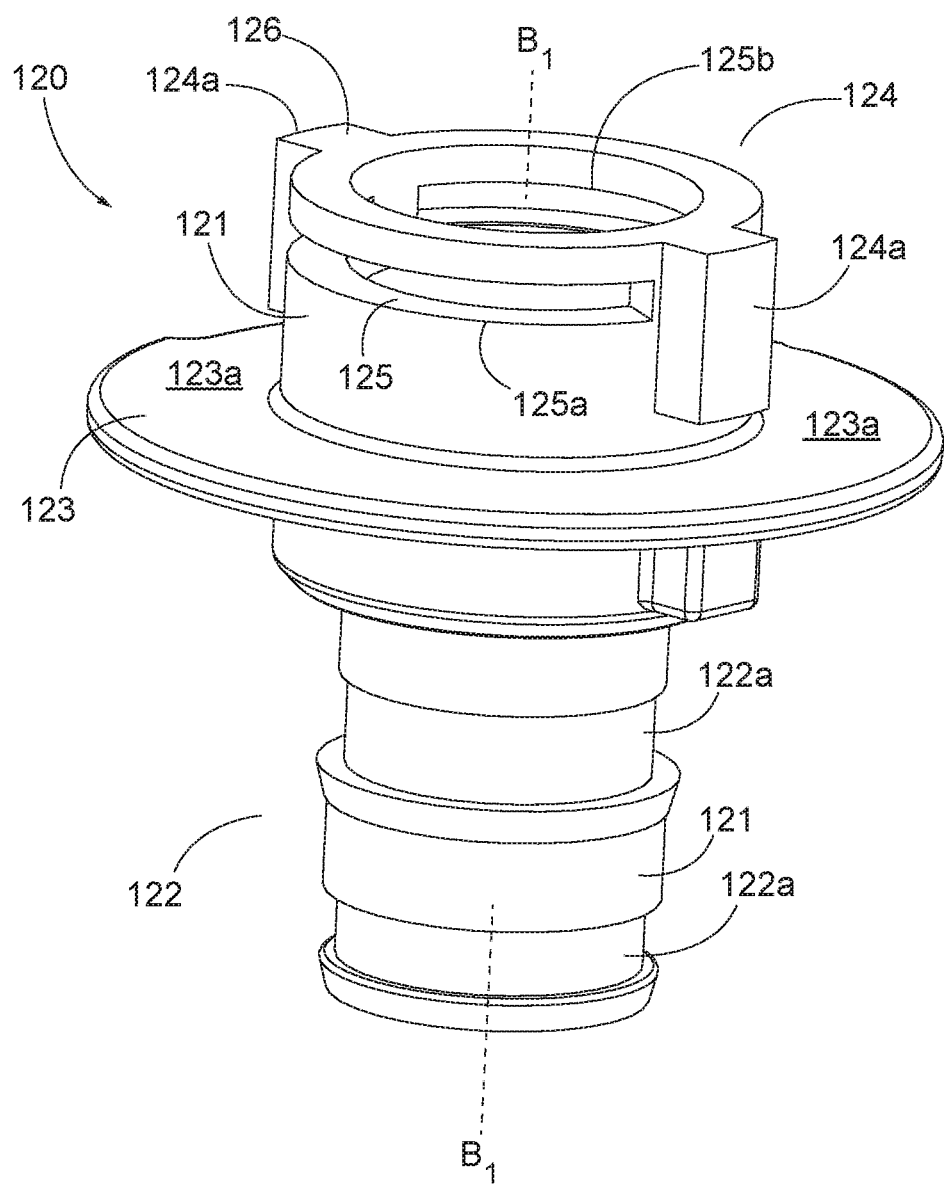
FIG. 10B is a front perspective view of the bottom portion of the supply valve illustrated in FIG. 10A.
Figure 10C:
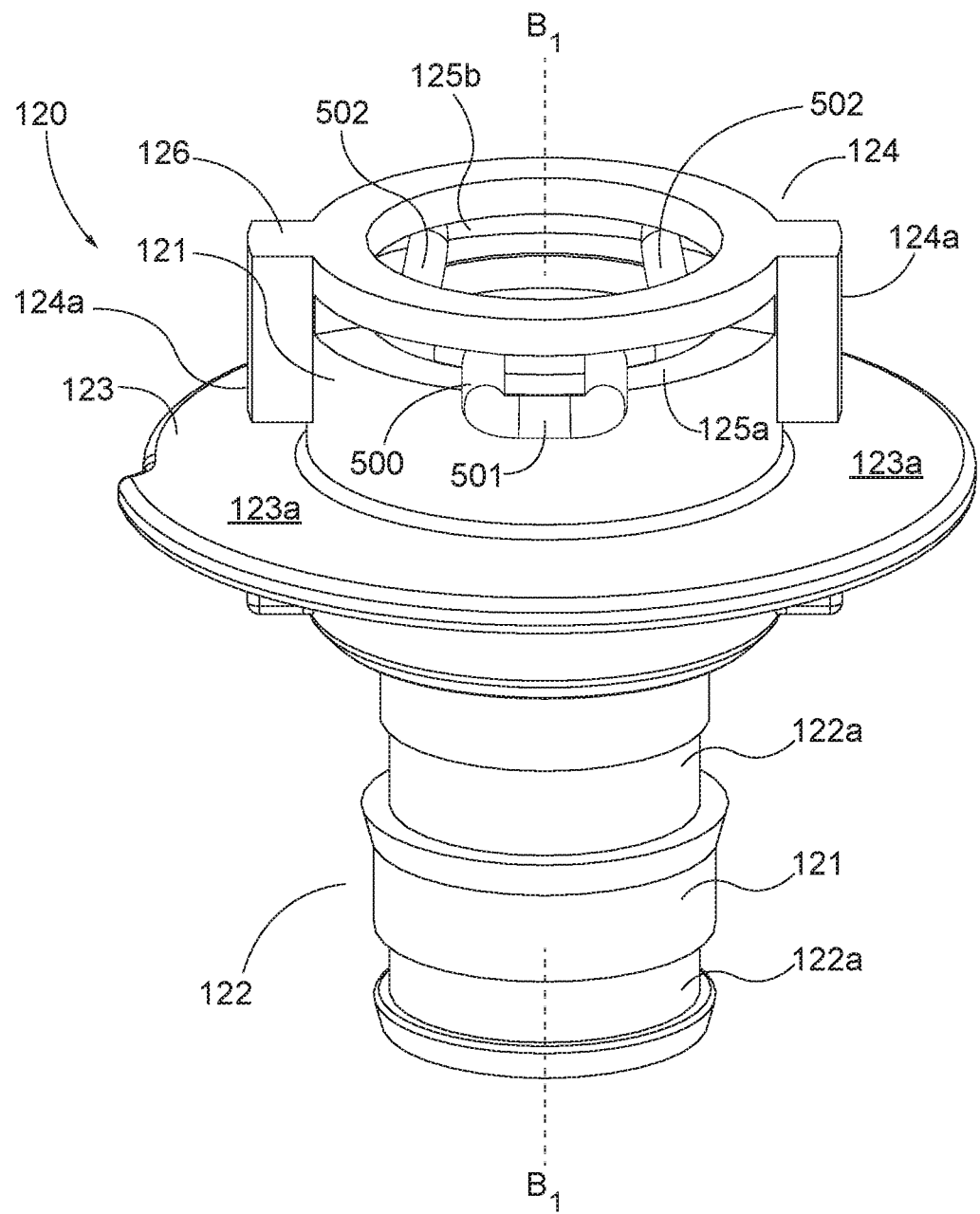
FIG. 10C is another front perspective view of the bottom portion of the supply valve illustrated in FIG. 10B, including a wireform clip in an inserted configuration.

With reference now to FIGS. 10A-10C, the bottom portion (120) is shown in greater detail. The bottom portion (120) includes a body (121) that is generally elongate along a central axis ($B_1$). The body (121) includes a lower connection area (122), a flange member (123), an upper mating area (124), and a hollow chamber extending through the body (121) to allow the passage of water (or other fluid medium). The lower connection area (122) is sized and configured to be inserted into a water supply line at the terminal portion, so as to attach the valve (100) to the water supply line. As shown particularly in FIG. 10A, the lower connection area (122) has a generally reduced diameter ($D_1$) with respect to the central axis ($B_1$) as compared to a remaining portion of the body (121), and the lower connection area (122) may include ridges (122a) having a diameter ($D_2$) with respect to the central axis ($B_1$), where $D_2<D_1$. The ridges (122a) may be fitted with o-rings (not illustrated), similar to those shown in FIG. 8, or another sealing means known in the art, such that when the lower connection area (122) of the bottom portion (120) is inserted into a terminal end of the water supply line, the lower connection area (122) will form a leak-proof seal with an inner wall of the terminal end. The flange member (123) of the bottom portion (120) has an expanded diameter ($D_3$) that is greater than both $D_1$ and $D_2$ such that an upper surface (123a) of the flange member (123) is configured abut an outer surface of the supply box (300), as partially shown in FIG. 1B. The upper mating area (124) may include a set of projections (124a) that are spaced from the upper surface (123a) along a direction parallel to the central axis ($B_1$) by a distance (T), best shown in FIG. 10A. The distance (T) may approximate a thickness (t) of the bottom wall (302) of the supply box (300), through which the supply valve openings (301) extend (see FIG. 1B). In some embodiments, the distance (T) may be substantially equal to the thickness (t), while in other embodiments, it may differ slightly.

With continuing reference to FIGS. 10A-10C, the upper mating area (124) may include a plurality of cutouts that form channels (125) in the body (121) of the bottom portion (120). In the illustrated embodiment, and as best shown in FIGS. 10B-C, the body (121) may include two channels (125a, 125b) that are formed on opposing sides of the body (121) and which are substantially aligned with one another along the central axis ($B_1$), as shown best in FIG. 10A. The channels (125) may have a diameter ($D_4$) as measured with respect to the central axis ($B_1$). As shown specifically in FIG. 10C, and as will be described in greater detail below, the diameter ($D_4$) of the channels (125) is sized and configured to receive opposing legs (502) of the clip (500). When the clip (500) is in the inserted configuration, a substantial entirety of the legs (502) will reside within the channels (125) of the bottom portion (120), as shown in FIG. 10C. As described above, when the clip (500) is in the inserted configuration, the narrowed gripping area (501) protrudes outwardly from the body (121) of the bottom portion (120). As shown in FIG. 10C, the upper mating area (124) of the bottom portion (120) also includes the top surface (126).

Figure 12:
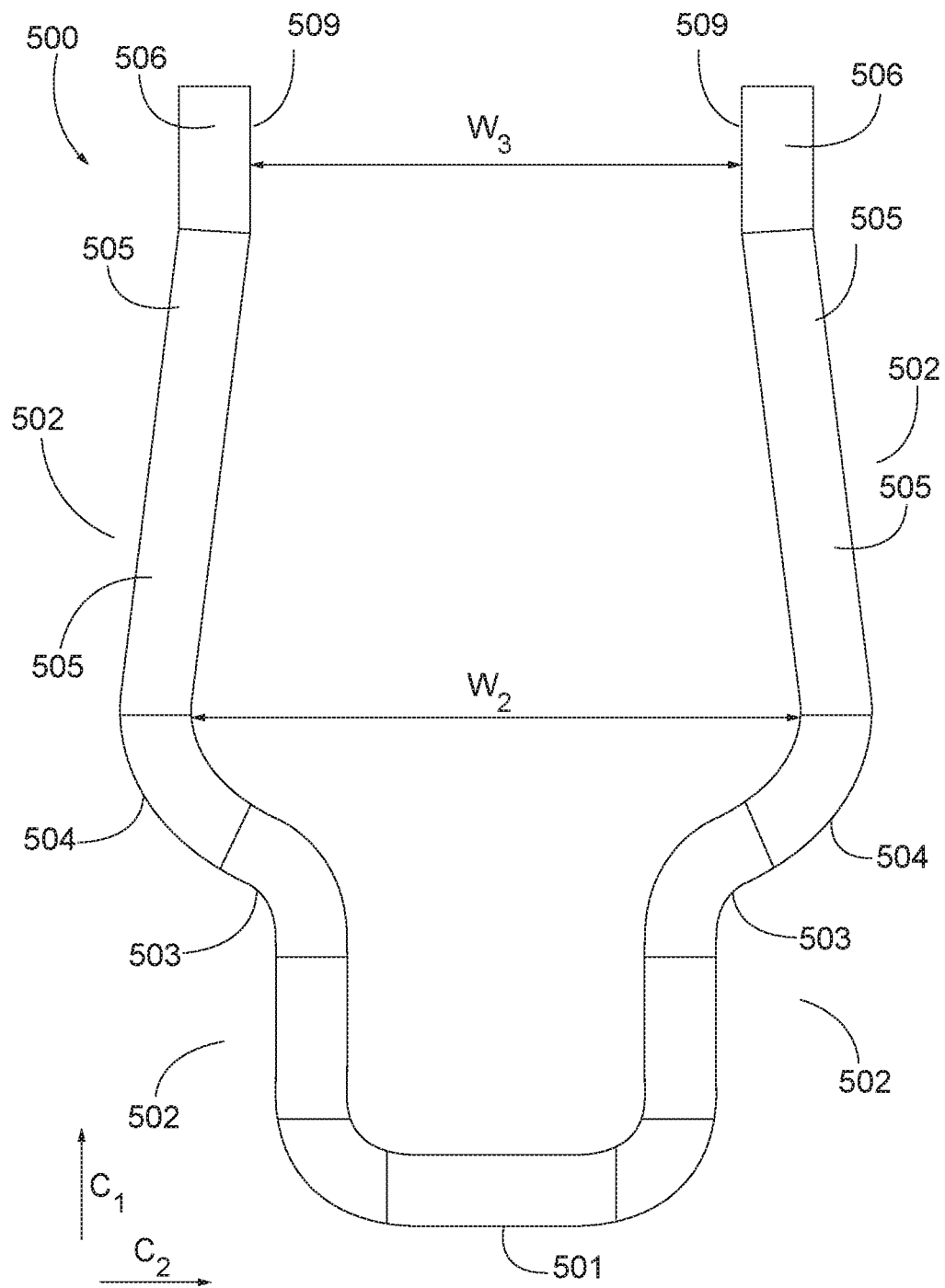
FIG. 12 is a top plan view of a wireform clip according to an embodiment of the invention.

With reference to FIG. 12, the wireform clip (500) is illustrated from a top view. The wireform clip (500) as shown and described may be substantially U-shaped, and it may be manufactured from a single piece of metallic wire (or other suitable material) that is bent, pressed, or otherwise shaped into the wireform clip (500) shown in FIG. 12. The clip (500) may have a substantially uniform thickness about an entirety of its length, although one of skill in the art will appreciate that thickened portions of the clip (500) may be desirable and are contemplated as being within the scope of the invention. The clip (500) includes the narrowed gripping area (501) previously described. As illustrated, two legs (502) extend outwardly from the narrowed gripping area (501) substantially along a first clip direction ($C_1$), and the legs (502) may approximate a substantially S-shaped configuration. That is, the legs (502) first extend parallel to one another along the first clip direction ($C_1$) away from the narrowed gripping area (501). The legs (502) then divergently curve away from one another at a first curved portion (503), and subsequently curve back toward one another at second curved portions (504). At the second curved portions (504), the legs (502) of the clip (500) may define a maximum width ($W_2$) as measured along a second clip direction ($C_2$) that is substantially perpendicular to the first clip direction ($C_1$). The maximum width ($W_2$) may be substantially equal to the diameter ($D_4$) of the channels (125), although slight variations therefrom are considered to be within the scope of the invention. From the second curved portion (504), the legs (502) extend along straight portions (505) that converge toward one another. Each one of the straight portions (505) extends along a direction that is angularly offset from the first clip direction ($C_1$). The straight portions (505) terminate in end portions (506) that may (as illustrated) curve slightly so as to be parallel to one another and aligned along the first clip direction ($C_1$). The end portions (506) may be spaced from one another along the second clip direction ($C_2$) by a third width ($W_3$) that is less than the maximum width ($W_2$). The third width ($W_3$) may conveniently be less than the first width ($W_1$) (corresponding to the spacing between the two recessed portions (118a) of the clip receiving ridge (118)) such that, when the wireform clip (500) is in the fully inserted configuration (described above), at least a portion of the end portions (506) of the legs (502) will extend completely through the passageways (109) and behind the body (111) of the top portion (110) to further retain the clip (500) within the clip-receiving ridge (118).

Figure 13:
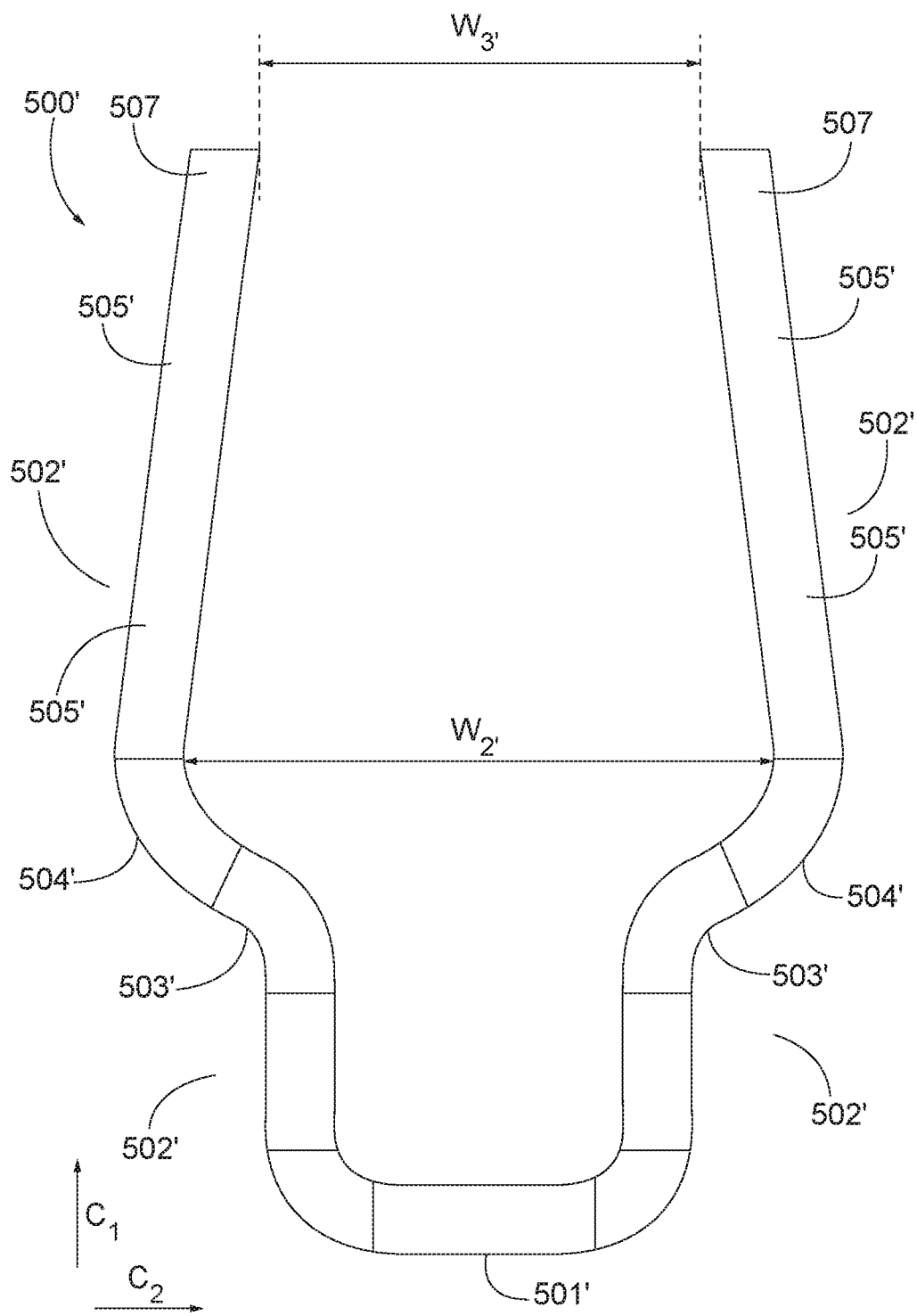
FIG. 13 is a top plan view of a wireform clip according to another embodiment of the invention.

With reference now to FIG. 13, the wireform clip (500') is illustrated from a top view. The wireform clip (500') is similar to clip (500) previously described, and where components or aspects are similar, they will be described with a prime symbol. The clip (500') also includes a narrowed gripping area (501') at a first end of the clip (500'). As illustrated, two legs (502') extend outwardly from the narrowed gripping area (501') substantially along a first clip direction ($C_1$), and the legs (502') may approximate a substantially S-shaped configuration. That is, the legs (502) first extend parallel to one another along the first clip direction ($C_1$) away from the narrowed gripping area (501'). The legs (502') then divergently curve away from one another at a first curved portion (503'), and subsequently curve back toward one another at second curved portions (504'). At the second curved portions (504'), the legs (502') of the clip (500') may define a maximum width ($W_2$') as measured along a second clip direction ($C_2$) that is substantially perpendicular to the first clip direction ($C_1$). The maximum width ($W_2$') may be substantially equal to the diameter ($D_4$) of the channels (125), although slight variations therefrom are considered to be within the scope of the invention. From the second curved portion (504'), the legs (502') extend along straight portions (505') that converge toward one another. Each one of the straight portions (505') extends along a direction that is angularly offset from the first clip direction ($C_1$). The straight portions (505) terminate in end portions (507). The end portions (507) may be spaced from one another along the second clip direction ($C_2$) by a third width ($W_3$') that is less than the maximum width ($W_2$'). The third width ($W_3$') may conveniently be less than the first width ($W_1$) (corresponding to the spacing between the two recessed portions (118a) of the clip receiving ridge (118)) such that, when the wireform clip (500') is in the fully inserted configuration (described above), at least a portion of the end portions (507) of the legs (502') will extend completely through the passageways (109) and behind the body (111) of the top portion (110) to further retain the clip (500') within the clip-receiving ridge (118).

The wireform clips (500, 500') may be flexible and allow for routine bending and contracting during installation and removal (the methods of which are described more fully below), such that the legs (502, 502') of the clip (500, 500') may freely flex (or bias) toward and away from one another during such installation and removal to facilitate such insertion/removal process as well as to retain the clip (500, 500') in the inserted configuration. The flexing and bending may, during an installation as described below, temporarily increase the third width ($W_3$, $W_3$') to be greater than the first width ($W_1$), such that the legs (502, 502') of the clip (500, 500') may extend around the two recessed portions (118a). It is further contemplated that the end portions (506, 507) may include a beveled tip or chamfered edge 509 at an inner portion thereof, where such bevel/chamfer may facilitate insertion and/or removal of the clip (500, 500') from the valve (100).

Figure 11A:
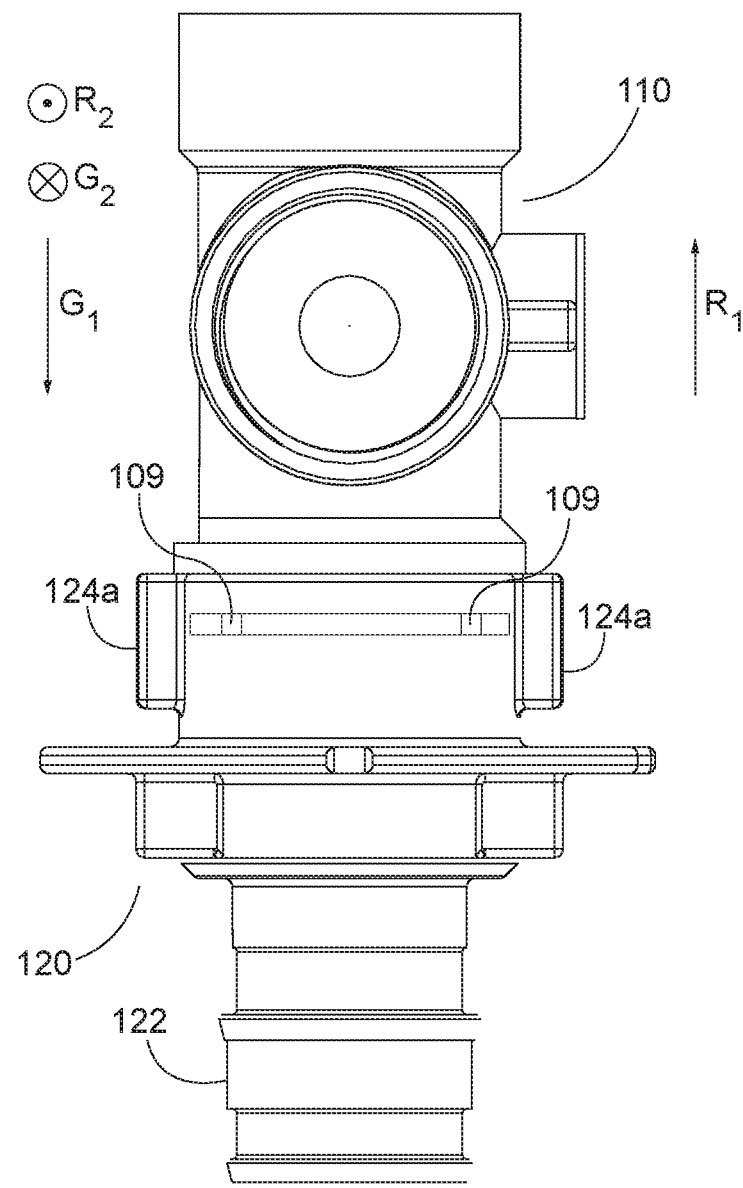
FIG. 11A is a front plan view of the top portion of the supply valve as illustrated in FIG. 9A assembled with the bottom portion of the supply valve as illustrated in FIG. 10A.

With reference now to FIG. 11A, the top and bottom portions (110, 120) of the valve (100) are shown connected to one another, where the top portion (110) has been inserted into the hollow chamber of the bottom portion (120).

To effectuate a method of installation, and with continuing reference to FIGS. 1B and 11A, a user may insert the lower connection area (122) of the bottom portion (120) into the terminal end of the supply line (not shown). In installations where the fully installed valve (100) is to be disposed within the supply box (300) as shown and described herein, the user may insert the projections (124a) of the bottom portion (120) through a corresponding portion (301a) of the supply valve openings (301) of the supply box (300) (see FIG. 1B). And the user may then subsequently rotate the bottom portion (120) along the central axis ($B_1$) by approximately 90 degrees to retain the bottom portion (120) to the bottom wall (302) of the supply box (300). Next, a user may line up the first axis ($A_1$) of the first port (112) of the top portion (110) with the central axis ($B_1$) of the bottom portion (120). After aligning the axes ($A_1$, $B_1$) the narrow ridged portion (116) of the top portion (110) may be inserted into the hollow chamber of the bottom portion (120) along a first insertion direction ($G_1$) until the flange-mating surface (119a) (as shown best in FIG. 9A) abuts against the top surface (126) on the bottom portion (120) (see FIG. 10C). Once the flange-mating surface (119a) abuts the top surface (126), the top and bottom portions (110, 120) may be considered to be fully inserted (also known as the "fully inserted configuration"). Even when in the fully inserted configuration, however, the top and bottom portions (110, 120) remain separable by moving the top portion (110) along a first removal direction ($R_1$) that is substantially opposite to the first insertion direction ($G_1$). Accordingly, the wireform clip (500) may be utilized to detachably retain the top and bottom portions (110, 120) in the fully inserted configuration by preventing the top portion (110) from being moved along the first removal direction ($R_1$) or from being rotated about the first axis ($A_1$). In order to introduce the wireform clip (500) so as to detachably retain the top and bottom portions (110, 120) in the fully inserted configuration, the top and bottom portions (110, 120) must be rotated with respect to one another about their respective axes ($A_1$, $B_1$) so as to align the two recessed portions (118a) of the clip-receiving ridge (118) of the top portion (110) with the channels (125) of the bottom portion (120). When the two recessed portions (118a) are so-aligned with the channels (125), the recessed portions (118a) will be fully viewable between both channels (125, 125b), as shown in FIG. 11A, and in this arrangement, may define passageways (109).

Figure 11B:
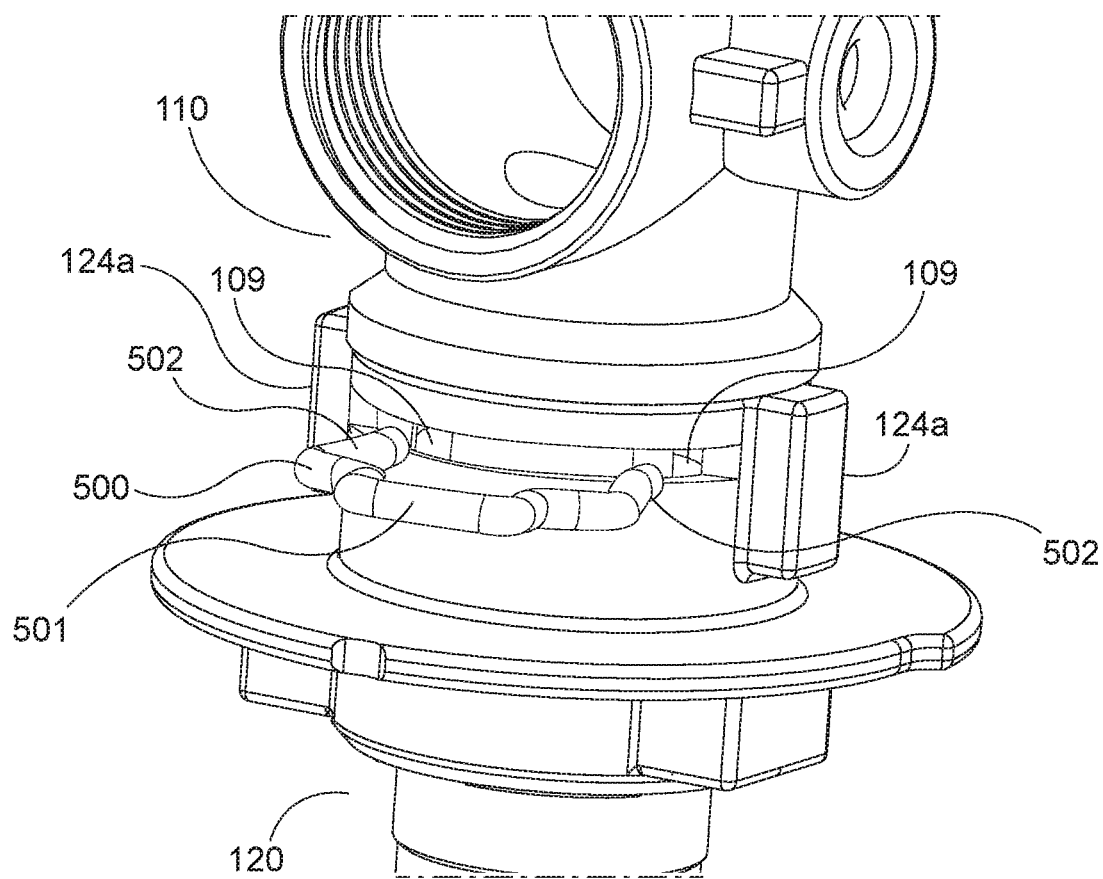
FIG. 11B is a front perspective view of the assembled supply valve as illustrated in FIG. 11A, including a wireform clip.

Accordingly, as shown in FIG. 11B, the legs (502) of the wireform clip (500) may simultaneously be inserted through the passageways (109) to detachably connect (or interconnect) the top portion (110) to the bottom portion (120). To facilitate installation of the clip (500) in this manner, the user may conveniently grasp the narrowed gripping area (501) of the clip (500) with his/her fingers, or alternatively with a tool. The wireform clip (500) may therefore be inserted in such manner along a second insertion direction ($G_2$) that is substantially perpendicular to the first insertion direction ($G_1$) previously described (as shown in FIG. 11A, the second insertion direction ($G_2$) is directed into the plane of the figure). When the wireform clip (500) has been fully inserted, the valve (100) will define the inserted configuration, and accordingly, the top and bottom portions (110, 120) will define a locked configuration. As noted above, and in the locked configuration, the top and bottom portions (110, 120) may be prevented from translating with respect to one another along the first removal direction ($R_1$), and they may likewise be prevented from rotating with respect to one another along their respective axes ($A_1$, $B_1$).

To effectuate a repair or replacement, the steps of the installation may generally be performed in reverse order to that set out above. Namely, a user will first remove the wireform clip (500) by grasping the narrowed gripping area (501) with his/her fingers, or else by using a tool (such as a flat head screwdriver, or the like). The user may remove the clip (500) by applying force to the clip (500) along a second removal direction ($R_2$) that is substantially opposite the second insertion direction ($G_2$) until the legs (502) of the clip (500) have been fully removed from the recessed portions (118a) of the clip-receiving ridge (118) and from both channels (125a, 125b). Next, a user may remove the top portion (110) from the bottom portion (120) by translating the top portion (110) along the first removal direction ($R_1$) so as to disengage the top and bottom portions (110, 120) from one another. This disengagement will break the leakproof seal created by the o-rings (108) with the inner surface of the bottom portion (120). Accordingly, it will be understood by one of ordinary skill in the art that the water flow through the supply lines having the valves (100) should be cut-off, shut-off, or otherwise terminated so as not to cause leaks or floods.

A key advantage of the valves (100) of the instant invention is that very little clearance space (particularly in a horizontal direction, perpendicular to the first insertion and first removal directions ($G_1$, $R_1$)) is required between two valves (100) connected in series (or between a valve (100) a side wall of the supply box (300)) to effectuate a repair or replacement of the valve (100) components, including the top and bottom portions (110, 120). This is so because the top and bottom portions (110, 120) are not removed from one another by rotation (such as the threaded embodiments of existing valve designs) but rather by translation along a first removal direction ($R_1$) after the wireform clip (500), or other locking mechanism, has been disengaged from the valve (100). Accordingly, horizontal clearance/separation ($X_1$) between adjacent valves (100) may be greatly reduced, for example, to fall within the range of 1.75-2.00 inches as measured from the central axis ($B_1$) of a first valve (100) and the central axis ($B_1$) of a second adjacent valve (i.e., "center-to-center"). The horizontal clearance/separation ($X_1$) between adjacent valves (101, 102) is shown in FIG. 1B. For example, and in an exemplary embodiment, the separation ($X_1$) between first and second valves (100) may be 1.95 inches measured from center-to-center, in the manner described above. In other contemplated embodiments, the center-to-center spacing may alternatively fall within the range of 1.50-1.75 inches or within the range of 2.00-2.50 inches. Existing and known valves of a cumbersome, threaded design must be installed at a greater center-to-center distance from one another because, as one of skill in the art will appreciate, plumbing code requires that replaceable sealing elements be able to be serviced in the field, and existing designs require greater clearance (and hence, greater spacing between them) to enable them to be serviceable and thereby up to code.

It is understood that the top and bottom portions (110, 120) of the valve (100) may be provided to a user factory-assembled in the locked configuration described above, or alternatively, they may be provided in a separated configuration. It is further understood that the top and bottom portions (110, 120) of the valve (100) may, for convenience, come pre-assembled with, for example, components shown in FIG. 2, such as the water hammer arrestor (105), the threaded connector (103), and the clip cover (106). It is contemplated that the supply valves (100), including primarily the bottom portions (120) may be designed and constructed to accommodate different diameter supply line pipes and may be sized and shaped to fit to the intended size pipe at the lower connection area (122). However, and despite these differences among bottom portion (120), it is contemplated that any bottom portion (120), regardless of the size diameter supply line pipe it is servicing and being connected to, may be interconnectable to a top portion (110), which are generally uniform. This advantage is important for users, particularly plumbers, because it enables them to carry a wide variety of sized bottom portions (120) in their possession, but knowing well that any top portion (110) will correctly and successfully mate with that varying bottom portion (120). Likewise, the wireform clip (500) may be universally sized to fit any pair of top and bottom portions (110, 120) regardless of the size of the bottom portion (120) as it varies to service a different sized water supply line.

What is claimed is:

1. A supply valve for use with water supply lines, the supply valve comprising:
   a top portion having at least two ports, a central valve area, and a ridged lower area that extends around a first one of the at least two ports, the first one of the at least two ports extends along a first axis into the central valve area, the central valve area is configured to receive a valve therein, and the ridged lower area includes a plurality of ridges that each define a reduced diameter with respect to an unreduced diameter of a remaining portion of the ridged lower area, wherein the reduced and unreduced diameters are measured with respect to the first axis;
   a bottom portion separately formed from the top portion, the bottom portion extending along a central axis and having an upper mating area, a lower connection area, and a hollow chamber extending through the bottom portion from the upper mating area to the lower connection area, the upper mating area includes two channels on opposing sides of the central axis, each channel extending through the upper mating area and into the hollow chamber, the channels each defining a respective length as measured along a direction perpendicular to the central axis;
   a wireform clip selectively interconnectable to the top and bottom portions to detachably couple the top and bottom portions to one another, the clip having two opposed legs that are joined together at a gripping area, the two opposed legs extend outwardly from the gripping area to respective end portions, and the two opposed legs angularly converge with respect to one another, such that a distance between the respective end portions of each one of the two legs is less than the reduced diameter of each of the plurality of ridges,
   wherein the ridged lower area of the top portion is sized and configured to be inserted into the hollow chamber of the bottom portion such that, in an assembled configuration, 1) the central axis is aligned with the first axis, and 2) at least one of the plurality of ridges of the top portion is aligned with the two channels of the bottom portion, such that the at least one of the plurality of ridges and the two channels cooperate to form two passageways, and wherein each leg of the clip is configured to be inserted into a respective one of the two passageways so as to define a locked configuration, wherein in the locked configuration, each leg of the clip extends through at least a majority of the respective passageway, and the top portion and bottom portion are prevented from translating relative to one another along the central axis and are prevented from rotating relative to one another about the central axis, wherein the end portions of the legs are chamfered at an inner portion thereof.

2. A supply valve for use with water supply lines, the supply valve comprising:

a top portion having at least two ports, a central valve area, and a ridged lower area that extends around a first one of the at least two ports, the first one of the at least two ports extends along a first axis into the central valve area, the central valve area is configured to receive a valve therein, and the ridged lower area includes a plurality of ridges that each define a reduced diameter with respect to an unreduced diameter of a remaining portion of the ridged lower area, wherein the reduced and unreduced diameters are measured with respect to the first axis;

a bottom portion separately formed from the top portion, the bottom portion extending along a central axis and having an upper mating area, a lower connection area, and a hollow chamber extending through the bottom portion from the upper mating area to the lower connection area, the upper mating area includes two channels on opposing sides of the central axis, each channel extending through the upper mating area and into the hollow chamber, the channels each defining a respective length as measured along a direction perpendicular to the central axis;

a wireform clip selectively interconnectable to the top and bottom portions to detachably couple the top and bottom portions to one another, the clip having two opposed legs that are joined together at a gripping area, the two opposed legs extend outwardly from the gripping area to respective end portions, and the two opposed legs angularly converge with respect to one another, such that a distance between the respective end portions of each one of the two legs is less than the reduced diameter of each of the plurality of ridges, wherein the ridged lower area of the top portion is sized and configured to be inserted into the hollow chamber of the bottom portion such that, in an assembled configuration, 1) the central axis is aligned with the first axis, and 2) at least one of the plurality of ridges of the top portion is aligned with the two channels of the bottom portion, such that the at least one of the plurality of ridges and the two channels cooperate to form two passageways, and wherein each leg of the clip is configured to be inserted into a respective one of the two passageways so as to define a locked configuration, wherein in the locked configuration, each leg of the clip extends through at least a majority of the respective passageway and the distance between the respective end portions of each one of the two legs is less than the reduced diameter of the at least one of the plurality of ridges, and the top portion and bottom portion are prevented from translating relative to one another along the central axis and are prevented from rotating relative to one another about the central axis.

3. The supply valve of claim 2, wherein the lower connection area of the bottom portion is adapted to sealingly secure to a first water supply line.

4. The supply valve of claim 2, wherein the wireform clip comprises a continuous, flexible material, and wherein the wireform clip has a uniform thickness.

5. The supply valve of claim 2, wherein the two legs of the wireform clip are flexible and may be temporarily biased toward one another to facilitate insertion or removal of the two legs from the two passageways.

6. A system including two of the supply valves recited in claim 1, such that each one of the two supply valves is configured to interconnect to a respective one of two adjacent water supply lines and be disposed within a single plumbing supply box.

7. The system of claim 6, wherein the two supply valves are configured to be separated from one another by a distance $X_1$ measured from respective central axes of a first and a second one of the two supply valves, wherein $X_1$ falls within the range of 1.75-2.00 inches.

8. The system of claim 6, wherein the wireform clip of either one of the supply valves may be configured to be disposed in either one of the two supply valves in the locked configuration.

9. The system of claim 6, wherein a first bottom portion of a first one of the two supply valves is operable with a second top portion of a second one of the two supply valves, such that a first wireform clip of the first supply valve may be configured to be disposed in the first bottom portion and second top portion in the locked configuration.

10. A supply valve system comprising:

a supply valve including:

a first bottom portion extending along a first central axis and having first and second channels extending through a first upper part of the first bottom portion on opposing sides of the first central axis, the first bottom portion further having a first lower part configured to interconnect to a first water supply line;

a first top portion having a first ridged bottom area that includes a plurality of ridges that each define a reduced diameter with respect to an unreduced diameter of a remaining portion of the first ridged bottom area, the first ridged bottom area being sized and configured to be received within a first hollow central portion of the first bottom portion such that at least one of the plurality of ridges is aligned with the first and second channels of the first bottom portion, such that the at least one of the plurality of ridges and the first and second channels cooperate to form two passageways; and a first wireform clip having two opposed legs that are each insertable through a respective one of the two passageways so as to positionally and rotationally lock the first top and first bottom portions with respect to one another, the two opposed legs are joined together at a gripping area, the two opposed legs extend outwardly from the gripping area to respective end portions, and the two opposed legs angularly converge with respect to one another as they extend from the gripping area toward their respective end portions, wherein in a locked configuration, each leg of the clip extends through at least a majority of the respective passageway and the distance between the respective end portions of each one of the two legs is less than the reduced diameter of the respective one of the plurality of ridges.

11. The system of claim 10, wherein the supply valve is a first supply valve and the system further comprises a second supply valve, the second supply valve including:
a second bottom portion extending along a second central axis and having third and fourth channels extending through a second upper part of the second bottom portion on opposing sides of the second central axis, the second bottom portion further having a second lower part configured to interconnect to a second water supply line;
a second top portion having a second ridged bottom area that is sized and configured to be received within a second hollow central portion of the second bottom portion; and
a second wireform clip insertable through the third and fourth channels and along a narrowed portion of the second ridged bottom area so as to positionally and rotationally lock the second top and second bottom portions with respect to one another.

12. The system of claim 11, wherein the first water supply line is a different water supply line from the second water supply line, such that the first and second supply valves may be housed within a single utility supply box.

13. The system of claim 11, wherein the first and second supply valves may be installed within a single utility supply box and are configured to be separated from one another by a distance $X_1$ as measured between the respective first and second central axes.

14. The system of claim 13, wherein the distance $X_1$ falls within the range of 1.75-2.00 inches.

15. The system of claim 11, wherein the first wireform clip is operable with the second supply valve, such that the first wireform clip may be configured to positionally and rotationally lock the second top and second bottom portions with respect to one another.

16. The system of claim 11, wherein the first bottom portion is operable with the second top portion, such that the first wireform clip may be configured to positionally and rotationally lock the second top portion and the first bottom portion with respect to one another.

17. The system of claim 11, wherein the first wireform clip comprises a U-shaped body having the opposed legs, the legs diverging outwardly from the gripping area of the first wireform clip.

18. The system of claim 17, wherein the legs of the first wireform clip are insertable along a direction of insertion through the first and second channels and along the first ridged bottom area so as to positionally and rotationally fix the first top and first bottom portions relative to one another, and wherein the gripping area resides outside of the first channel when the legs are so-inserted so as to facilitate removal of the first wireform clip along a direction opposite the direction of insertion.

19. A supply valve system comprising:
a first supply valve including:
a first bottom portion extending along a first central axis and having first and second channels extending through a first upper part of the first bottom portion on opposing sides of the first central axis, the first bottom portion further having a first lower part configured to interconnect to a first water supply line,
a first top portion having a first ridged bottom area that is sized and configured to be received within a first hollow central portion of the first bottom portion, and
a first wireform clip insertable through the first and second channels and along a narrowed portion of the first ridged bottom area so as to positionally and rotationally lock the first top and first bottom portions with respect to one another; and
a second supply valve including:
a second bottom portion extending along a second central axis and having third and fourth channels extending through a second upper part of the second bottom portion on opposing sides of the second central axis, the second bottom portion further having a second lower part configured to interconnect to a second water supply line,
a second top portion having a second ridged bottom area that is sized and configured to be received within a second hollow central portion of the second bottom portion, and
a second wireform clip insertable through the third and fourth channels and along a narrowed portion of the second ridged bottom area so as to positionally and rotationally lock the second top and second bottom portions with respect to one another,
wherein the first bottom portion and the second bottom portion are sized and shaped differently than one another, such that: 1) the first supply valve is operable with the second bottom portion, and 2) the second supply valve is operable with the first bottom portion.

* * * * *